US012715954B2

(12) United States Patent
Feng et al.

(10) Patent No.: US 12,715,954 B2
(45) Date of Patent: Aug. 25, 2026

(54) POLYCARBAMATE SYNTHESIS VIA CHAIN-GROWTH COPOLYMERIZATION

(71) Applicants: Yves Gnanou, Paris (FR); Xiaoshuang Feng, Zibo (CN)

(72) Inventors: Xiaoshuang Feng, Thuwal (SA); Mingchen Jia, Thuwal (SA); Yves Gnanou, Thuwal (SA)

(73) Assignees: Yves Gnanou, Paris (FR); Xiaoshuang Feng, Zibo (CN)

( * ) Notice: Subject to any disclaimer, the term of this patent is extended or adjusted under 35 U.S.C. 154(b) by 467 days.

(21) Appl. No.: 17/923,395

(22) PCT Filed: May 6, 2021

(86) PCT No.: PCT/IB2021/053865

§ 371 (c)(1),
(2) Date: Nov. 4, 2022

(87) PCT Pub. No.: WO2021/224866

PCT Pub. Date: Nov. 11, 2021

(65) Prior Publication Data

US 2023/0242699 A1 Aug. 3, 2023

Related U.S. Application Data

(60) Provisional application No. 63/033,409, filed on Jun. 2, 2020, provisional application No. 63/020,653, filed on May 6, 2020.

(51) Int. Cl.
*C08G 18/00* (2006.01)

(52) U.S. Cl.
CPC .................................. *C08G 18/003* (2013.01)

(58) Field of Classification Search
CPC .................................................... C08G 18/003
See application file for complete search history.

(56) References Cited

U.S. PATENT DOCUMENTS 4,377,646 A 3/1983 Blount

FOREIGN PATENT DOCUMENTS

JP WO 2003020786 A1 * 12/2004

OTHER PUBLICATIONS

"First Office Action Received mailed on Aug. 17, 2023", 9 Pages.
International Search Report and Written Opinion for PCT Application No. PCT/IB2021/053865, mailed Aug. 19, 2021, Aug. 19, 2021, 11 pages.
"Chinese Office Action for Application No. 2021800332293, mailed Feb. 28, 2024", 12 Pages.
Zhang, Dapeng , et al., "Polymerization of Cyclic Carbamates: A Practical Route to Aliphatic Polyurethanes", Macromolecules 2019, 52, 2719-2724.
Baronsky, Thilo , et al., "Bimetallic Aluminum(salen) Catalyzed Synthesis of Oxazolidinones from Epoxides and Isocyanates", ACS Catal. 2013, 3, 790-797.
Beattie, Christopher , et al., "VanadiumV(salen) catalysed synthesis of oxazolidinones from epoxides and Isocyanates", RSC Adv., 2014, 4, 31345.
Blattmann, Hannes , et al., "Isocyanate- and Phosgene-Free Routes to Polyfunctional Cyclic Carbonates and Green Polyurethanes by Fixation of Carbon Dioxide", Macromol. Rapid Commun. 2014, DOI: 10.1002/marc.201400209.
Castro-Osma, Jose , "Synthesis of Oxazolidinones from Epoxides and Isocyanates Catalysed by Aluminium Heteroscorpionate Complexes", ChemCatChem 2016, 8, 2100-2108.
Chen, Zuliang , et al., "Poly(urethane-carbonate)s from Carbon Dioxide", Macromolecules 2017, 50, 2320-2328.
Chen, Qin , et al., "Preparation of lignin/glycerol-based bis(cyclic carbonate) for the synthesis of polyurethanes", Green Chem., 2015, 17, 4546-4551.
Dewit, Matthew , et al., "A Cascade Biodegradable Polymer Based on Alternating Cyclization and Elimination Reactions", J. Am. Chem. Soc. 2009, 131, 18327-18334.
Dyer, Elizabeth , et al., "Thermal Degradation of Carbamates of Methylenebis-(4-phenyl Isocyanate)", vol. 80, May 12, 1958, 5495-5498.
Engels, Hans-Wilhelm , et al., "Polyurethanes: Versatile Materials and Sustainable Problem Solvers for Today's Challenges", Angew. Chem. Int. Ed. 2013, 52, 9422-9441.
Haba, Osamu , et al., "Anionic Ring-Opening Polymerization of a Five-Membered Cyclic Urethane Derived From D-glucosamine", Journal of Polymer Science, Part A: Polymer Chemistry 2019, 57, 2491-2497.
Hall, H. K. , et al., "Polymerization of Cyclic Esters, Urethans, Ureas and Imides", vol. 80, 6410-6412, Jun. 30, 1958.
Ihata, Osamu , et al., "Synthesis of Thermoresponsive Polyurethane from 2-Methylaziridine and Supercritical Carbon Dioxide", Angew. Chem. Int. Ed. 2004, 43, 717-719.

(Continued)

*Primary Examiner* — Rabon A Sergent
(74) *Attorney, Agent, or Firm* — Billion & Armitage

(57) ABSTRACT

The present disclosure features materials and methods for synthesizing polycarbamates via chain-growth copolymerization in the presence of a Lewis acid of a first reactant having a oxirane or thiirane moiety and at least one heteroallene reactant, wherein a first heteroallene reactant is an isocyanate or an isothiocyanate. Also featured are polycarbamate copolymers and terpolymers according to formula (I): (I), wherein An is a halogen atom or a carboxylate or alkoxide moiety; each X and X' is independently an oxygen or a sulfur atom; each R1 and R2 is independently a hydrogen atom or an alkyl group including linear, branched, saturated, unsaturated, aromatic, cyclic alkyl groups, and heteroatom-containing alkyl groups, R3 is an electron deficient group, m and o are independently selected from integers ≥1 and n is 0 or an integer ≥1. Both X and X' can be the same or X and X' can be different.

19 Claims, 29 Drawing Sheets

(56) References Cited

OTHER PUBLICATIONS

Jurrat, Mark , et al., "Polyurethanes and Polyallophanates via Sequence-Selective Copolymerization of Epoxides and Isocyanates", Journal of the American Chemical Society, Apr. 20, 2020, 6 pages.
Kreye, Oliver , et al., "Sustainable routes to polyurethane precursors", Green Chem., 2013, 15, 1431-1455.
Kusan, Jacqueline , et al., "Cationic Ring-Opening Polymerization of Tetramethylene Urethane", Macromolecules 2001, 34, 389-395.
Lebedev, Boris , et al., "Thermodynamics of Aliphatic Cyclic Urethanes, of Their Ring-Opening Polymerization, and of Corresponding Polyurethanes", Macromol. Chem. Phys. 2002, 203, No. 8.
Maisonneuve, Lise , et al., "Isocyanate-Free Routes to Polyurethanes and Poly(hydroxy Urethane)s", American Chemical Society, Chemical Reviews, Jun. 15, 2015, 33 pages.
Marvel, C. S. , et al., "The Effect of an Acetylenic Unit on the Physical Properties of Polyesters and Polyurethans", vol. 72, Apr. 1950, 1674-1677.
McKiernan, Robin , et al., "Synthesis and characterization of polyethylene-like polyurethanes derived from long-chair, aliphatic a,w-diols", Polymer 43 (2002) 3007-3017.
More, Arvind , et al., "Novel fatty acid based di-isocyanates towards the synthesis of thermoplastic polyurethanes", European Polymer Journal 49 (2013) 823-833.
Neffgen, Stephan , et al., "Cationic Ring-Opening Polymerization of Trimethylene Urethane: A Mechanistic Study", Macromolecules 1997, 30, 1289-1297.
Neffgen, Stephan , et al., "Ring-opening polymerization of cyclic urethanes and ringclosing depolymerization of the respective polyurethanes", Macromol. Rapid Commun. 17, 373-382 (1996).
Paddock, Robert , et al., "[(Salcen) CrIII + Lewis base]-catalyzed synthesis of N-aryl-substituted oxazolidinones from epoxides and aryl isocyanates", Chem. Commun., 2014, 50, 15187-15190.
Peerlings, H. W. I. , et al., "Fast and Convenient Construction of Carbamate/Urea-Based Dendrimers with a Diisocyanate Building Block", Journal of Polymer Science: Part A: Polymer Chemistry, vol. 39, 3112-3120 (2001) © 2001 John Wiley & Sons, Inc.
Sagi, Amit , et al., "Self-Immolative Polymers", J. Am. Chem. Soc. 2008, 130, 5434-5435.
Spindler, Ralph , et al., "Synthesis and Characterization of Hyperbranched Polyurethanes Prepared from Blocked socyanate Monomers by Step-Growth Polymerization", Macromolecules 1993,26, 4809-4813.
Unverferth, Maike , et al., "Renewable Non-Isocyanate Based Thermoplastic Polyurethanes via Polycondensation of Dimethyl Carbamate Monomers with Diols", Macromol. Rapid Commun. 2013, 34, 1569-1574.
Wang, Peng , et al., "Synthesis of Oxazolidinones from Epoxides and Isocyanates Catalyzed by Rare-Earth-Metal Complexes", ChemCatChem 2015, 7, 1145-1151.
Wong, Andrew , et al., "Multiresponsive Azobenzene End-Cap for Self-Immolative Polymers", ACS Macro Lett. 2014, 3, 1191-1195.
Zenner, Michael , et al., "Polyurethanes from Isosorbide-Based Diisocyanates", ChemSusChem 2013, 6, 1182-1185.
Zhang, Xingxian , et al., "A Facile and Efficient Synthesis of 3-Aryloxazolidin-2-ones from Isocyanates and Epoxides Promoted by Mgl2 Etherate", Synthetic Communications®, 40:24, 3654-3659.
Communication Pursuant to Article 94(3) EPC for EP Application No. 21726984.4 mailed on Sep. 3, 2024, 4 Pages.
Decision of Rejection Received for application No. 202180033229.3 mailed on Jul. 3, 2024, 18 Pages.
"Third Office Action for Chinese Application No. 2021800332293 mailed Jan. 16, 2025, 6 pages".

* cited by examiner

Table 1. Representative data for Lewis acid assisted copolymerization of epoxides or episulfides with heteroallenes[a]

| Entry | Epoxide/Episulfide (EP) | Heteroallene (HA) | Initiator (I) | Lewis acid (LA) | Ep/HA/LA/I (molar ratio) | Yield (%)[b] | Ether or thioether Content[c]/% | $M_n$[d]/ $10^3$ | Đ[d] |
|---|---|---|---|---|---|---|---|---|---|
| **1** | PO | TSI | PPNCl | TEB | 100/150/2/1 | 95 | <1 | 19 | 1.1 |
| **2** | OO | TSI | TBACl | TEB | 100/110/2/1 | >99 | <1 | 18 | 1.1 |
| **3** | BO | PFPI | PPNCl | TPB | 200/220/0.5/1 | >99 | <1 | 52 | 1.2 |
| **4** | PO | TSI | DHMB/$P_4$-t-Bu | TEB | 500/550/2/1 | >99 | <1 | 110 | 1.3 |
| **5** | BGE | BTFMPI | TOACl | TEA | 250/275/2/1 | >99 | 5 | 87 | 1.2 |
| **6** | CHO | TCAI | HMB/$P_4$-t-Bu | TiBA | 1000/1100/1/1 | 95 | <1 | 240 | 1.3 |
| **7** | AGE | CBSI | PPNAc | TPA | 550/605/3/1 | 90 | <1 | 69 | 1.3 |
| **8** | SO | CSI | HMB/$P_4$-t-Bu | DEZ | 300/330/2/1 | 77 | <1 | 72 | 1.3 |
| **9** | PES | PIT | TBACl | TEB | 100/110/2/1 | 88 | 7 | 18 | 1.2 |
| **10** | CHES | AIT | PPNCl | TPA | 200/220/1/1 | 80 | <1 | 39 | 1.2 |
| **11** | ETCH | PFIT | TOACl | TiBA | 500/550/4/1 | 65 | 3 | 85 | 1.3 |
| **12** | EES | EOCIT | TBAS | DBM | 1000/1100/1/1 | >99 | 12 | 176 | 1.3 |
| **13** | PO | PFIT | TOACl | TiBB | 200/220/2/1 | 90 | 11 | 49 | 1.2 |
| **14** | OO | TFMPIT | PPNCl | TEB | 100/110/3/1 | 78 | <1 | 17 | 1.2 |
| **15** | PES | TSI | TBABO | TPB | 500/550/1/1 | 95 | <1 | 125 | 1.2 |
| **16** | CHES | TCAI | HMB/$P_4$-t-Bu | TPA | 1000/1100/1/1 | 92 | <1 | 235 | 1.2 |
| **17** | PO | TSI | PPNCl | TEB | 1000/263/2/1 | 58 | 60 | 80 | 1.3 |
| **18** | PES | PFIT | TBACl | TPA | 1000/500/2/1 | 78 | 33 | 128 | 1.3 |

FIG. 2

Table 2. Representative data for the trialkylborane-mediated copolymerization of epoxides with *p*-tosyl isocyanate[a]

| Entry | Epoxide (E) | Initiator (I) | Borane (B) | E/TSI/B/I (molar ratio) | Ether content[b] (%) | Yield[c] (%) | $M_{n(theo)}$[d] (kg/mol) | $M_n$[e] (kg/mol) | Đ[e] |
|---|---|---|---|---|---|---|---|---|---|
| 1 | PO | TBACl | TEB | 100/110/2/1 | <1 | >99 | 26 | 20 | 1.1 |
| 2 | PO | TBACl | TEB | 25/37.5/2/1 | <1 | >99 | 6.4 | 5.6 | 1.1 |
| 3 | PO | TBACl | TEB | 500/550/2/1 | <1 | 31 | 40 | 33 | 1.2 |
| 4[f] | PO | TBACl | TEB | 500/550/2/1 | <1 | 95 | 121 | 104 | 1.3 |
| 5 | PO | PPNCl | TEB | 100/110/2/1 | 5 | >99 | 26 | 17 | 1.1 |
| 6 | PO | DHMB/$P_4$-t-Bu | TEB | 500/550/2/1 | <1 | 76 | 97 | 83 | 1.3 |
| 7[g] | PO | TBACl | TPB | 100/110/2/1 | <1 | 75 | 19 | 15 | 1.2 |
| 8[g] | PO | PPNCl | TPB | 1000/1100/0.5/1 | <1 | >99 | 255 | 225 | 1.5 |
| 9 | PO | TBACl | TsBB | 100/110/2/1 | <1 | 27 | 6.9 | 6.2 | 1.1 |
| 10[g] | EO | TBACl | TEB | 100/110/2/1 | <1 | >99 | 24 | nd[h] | nd[h] |
| 11 | CHO | PPNCl | TEB | 100/110/2/1 | <1 | 54 | 16 | 9.3 | 1.2 |
| 12 | AGE | TBACl | TEB | 100/110/2/1 | <1 | >99 | 31 | 22 | 1.3 |

FIG. 9

Table 3. Representative data for Lewis acid assisted terpolymerization of epoxides or episulfides with two heteroallenes[a]

| Entry | Ep | $HA_1$ | $HA_2$ | I | LA | $EP/HA_1/HA_2/LA/I$ (molar ratio at adding) | $EP/HA_1/HA_2$ (molar ratio in polymer)[b] | $M_n^c/10^3$ | Đ[c] |
|---|---|---|---|---|---|---|---|---|---|
| **1** | PO | BSI | $CO_2$ | TBABO | TEB | 100/50/50/2/1 | 98/45/30 | 13 | 1.2 |
| **2** | OO | TSI | $CO_2$ | DHMB/$P_4$-t-Bu | TPB | 500/450/50/1/1 | 490/430/40 | 137 | 1.3 |
| **3** | CHO | PFPI | $CO_2$ | PPNCl | TEB | 200/150/50/2/1 | 190/150/40 | 50 | 1.2 |
| **4** | PO | TCAI | $CS_2$ | TBAS | TiBA | 100/80/20/2/1 | 99/80/18 | 19 | 1.1 |
| **5** | BGE | CBSI | $CS_2$ | PPNAc | TPA | 250/150/100/2/1 | 220/150/70 | 57 | 1.2 |
| **6** | PES | FPIT | $CS_2$ | TOACl | BCF | 400/200/200/3/1 | 380/170/200 | 65 | 1.3 |
| **7** | BES | PFIT | $CS_2$ | HMB/$P_4$-t-Bu | DMZ | 1000/800/200/2/1 | 870/800/70 | 233 | 1.3 |
| **8** | PES | PFPI | $CO_2$ | TOACl | TPB | 100/50/50/2/1 | 97/50/35 | 22 | 1.1 |
| **9** | HO | PIT | $CS_2$ | TBACl | TEB | 200/150/50/2/1 | 170/140/30 | 32 | 1.2 |
| **10** | PGE | NPIT | COS | PPNCl | TPA | 100/50/50/1/1 | 92/50/40 | 24 | 1.2 |
| **11** | OES | BSI | COS | TBAS | TEB | 1000/800/200/4/1 | 700/520/160 | 188 | 1.3 |
| **12** | CHO | TSI | COS | PPNCl | TPB | 500/400/100/1/1 | 490/400/90 | 96 | 1.2 |

FIG. 29

POLYCARBAMATE SYNTHESIS VIA CHAIN-GROWTH COPOLYMERIZATION

BACKGROUND

Polyurethanes, whose repeating units include carbamate linkages, are sometimes also called polycarbamates. As one of the most important industrial polymers, polyurethanes have been widely used in daily life, ranging from soft foams for bed mattresses to rigid foams for thermal insulation, paints, coatings, construction, elastomers, and adhesives. Generally, polyurethanes are produced through polyaddition reactions between diols and diisocyanates. Utilizing monomers with more than a functionality of 2 through one step polyaddition or stepwise addition, hyperbranched or dendrimer-type polyurethanes can be respectively obtained. Polyurethanes can also be synthesized through polycondensation strategies, polycondensations either between carbamates and alcohol or between carbonates and amines can both generate polyurethanes. Upon judiciously designing the structure of monomer, carbamate linkages of the obtained polyurethanes or polycarbamates can be easily cleaved and thus the polymers can self-immolate into small organic compounds once the terminal group capped at one end was eliminated.

Besides these traditional polycondensation process, ring-opening polymerization of cyclic urethanes is another alternative for polyurethane synthesis. The preparation of polyurethane through the cationic ring opening polymerization of 6-membered and 7-membered cyclic carbamates has been reported. Similar to cyclic carbonates, 6-membered cyclic carbamates can also be ring opened and polymerized anionically. Anionic ring opening polymerization of 5-membered cyclic carbamates derived from naturally abundant D-glucosamine with hindered substituent group has been investigated. A anionic ring opening polymerization of 5-membered cyclic carbamates with a co-initiator normally adopted in the anionic ring opening polymerization of lactams was recently reported.

In order to avoid utilization of phosgene and its derivatives, some other synthetic strategies have been proposed. Ring-opening polycondensation of bicyclic carbonates with diamines in a step-growth mode generates the so-called poly(hydroxyurethane)s, where bicyclic carbonates can be obtained through coupling reaction of $CO_2$ with epoxides. Direct copolymerization of aziridines with $CO_2$ and polycondensation of $CO_2$, diamines and dihalides in the presence of $Cs_2CO_3$ can produce polyurethanes without resorting to phosgene and its derivatives.

Generally, under catalysis of metallic complexes such as chromium, vanadium, aluminum, or recently by metal-free organic tetraarylphosphonium salt, cyclic carbamates, 5-oxazolidinones can be generated through [2+3] cycloaddition of epoxides and isocyanates; however, trimerization of isocyanates was observed as a common side reaction which has to be suppressed. Very recently, synthesis of polyurethane or polyallophanates with low molar masses through ring opening copolymerization of cyclohexene oxide with aryl isocyanate using dimagnesium catalyst has been reported.

New synthetic strategies for providing polycarbamate copolymers under mild conditions or that minimize side reactions would be useful to meet industrial demands and expand the structural diversity of these polymers.

SUMMARY

The present disclosure features materials and methods for synthesizing polycarbamates via chain-growth copolymerization of oxirane- or thiirane-containing monomers and isocyanate- or isothiocyanate-containing monomers, and polycarbamates copolymers obtainable by these methods. The copolymer synthesis includes contacting a first reactant having a oxirane or thiirane moiety and at least one heteroallene reactant in the presence of a Lewis acid, wherein a first heteroallene reactant is an isocyanate or an isothiocyanate.

The materials and methods of the present disclosure can provide polyurethane or polythiourethane copolymers (i.e., polycarbamates) in the presence of Lewis acids, including non-metal Lewis acids, under mild conditions while minimizing side reactions. The copolymerization of epoxides with isocyanates can afford totally alternated polycarbamates. When electro-deficient isocyanates are used, the trimerization of isocyanates is negligible, and polycarbamates are obtained as main products. These polymerization conditions can be applied to isothiocyanates, and other monomers comprising three-membered heterocyclic groups, such as episulfide. Methods described in the present disclosure can also be used to prepare copolymers (statistic, gradient or block copolymers) through terpolymerization with heteroallene monomers such as carbon dioxide, carbon disulfide or carbonyl sulfide.

In a first aspect, embodiments of the present disclosure feature a polycarbamate copolymer represented by formula (I):

(I)

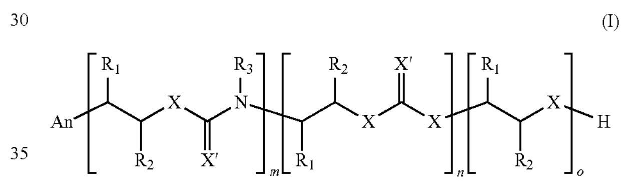

wherein An is a halogen atom or a carboxylate or alkoxide moiety; X and X' at each occurrence are independently an oxygen or a sulfur atom. $R_1$ and $R_2$ at each occurrence are independently selected from a hydrogen atom or an alkyl group including linear, branched, saturated, unsaturated, aromatic, cyclic alkyl groups, and heteroatom-containing alkyl groups; $R_3$ is an electron deficient group; m and o are independently selected from integers 1 and n is 0 or an integer 1. The An carboxylate and alkoxide can be selected from the group consisting of mono- or polyfunctional carboxylates and mono- or polyfunctional alkoxides. The X and X' can be the same (i.e. both X and X' are oxygen or both X and X' are sulfur), or different (i.e., either X is oxygen and X' is sulfur, or X' is oxygen and X is sulfur) within the same repeating unit or within all the repeating units. In some cases, X=X' at all instances in the m repeating unit, the n repeating unit, or all repeating units. Each X can be the same at each instance in the polymer. The copolymer can be fully alternating. The value of n can be an integer 1. When n is ≥1, the copolymer can be a block or gradient copolymer. $R_1$ and $R_2$ can be independently selected from the group consisting of a hydrogen atom, linear or branched, saturated or unsaturated $C_1$-$C_{20}$ alkyl groups, $C_1$-$C_{20}$ alkyl groups having one or more aromatic rings and linear or branched heteroatom-containing $C_1$-$C_{20}$ alkyl groups, wherein the heteroatom includes one or more atoms selected from O, N, S, Si, P, and halogen atoms. $R_3$ can be selected from the group consisting of phenyl, benzoyl, acetyl, trichloroacetyl, allyl, benzenesulfonyl, p-toluenesulfonyl, 4-chlorobenzenesulfonyl, 4-fluorobenzenesulfonyl, chlorosulfonyl, fluorinated phenyl having one to five fluorine atoms located at the ortho-, meta-, or para-position; phenyl having one or more nitro groups located at the ortho-, meta-, or para-position; phenyl having one or more trifluoromethyl groups located at the ortho-, meta-, or para-position, and phenyl having two or more different substitutions selected from the group consisting of halogen atoms, fluorine atoms, nitro groups, trifluoromethyl groups, aromatic groups, cyclic alkyl groups, and heteroatom-containing alkyl groups. The copolymer can have a number average molecular mass ($M_n$) within a range of about 1,000 to about 300,000 kg/mol. The copolymer can have a dispersity of less than 2 and optionally the dispersity can be within a range of 1 to 1.6. The copolymer can have the structure of formula (II):

(II)

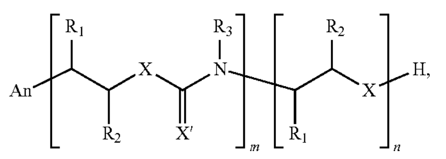

wherein An is a halogen atom or a carboxylate or alkoxide moiety; X and X' at each occurrence are independently an oxygen or a sulfur atom; $R_1$ and $R_2$ at each occurrence are independently selected from a hydrogen atom or an alkyl group including linear, branched, saturated, unsaturated, aromatic, cyclic alkyl groups, and heteroatom-containing alkyl groups; $R_3$ is an electron deficient group; and m and n are independently selected from integers ≥1. The An carboxylate and alkoxide can be selected from the group consisting of mono- or polyfunctional carboxylates and mono- or polyfunctional alkoxides. The X and X' can be the same (i.e. both X and X' are oxygen or both X and X' are sulfur), or different (i.e., either X is oxygen and X' is sulfur, or X' is oxygen and X is sulfur) within the same repeating unit. In some cases, X=X' at all instances in the repeating unit. Each X can be the same at each instance in the polymer.

In a second aspect, the present disclosure features a method of making a polycarbamate copolymer comprising: contacting, in the presence of a Lewis acid, a first reactant comprising an oxirane or thiirane moiety and one or more additional reactants selected from heteroallenes, wherein a first heteroallene is selected from the group consisting of isocyanates and isothiocyanates. The Lewis acid can be selected from the group consisting of borane-, aluminum-, magnesium- and zinc-based Lewis acids. The Lewis acid can be an alkylborane, trialkylborane, triethylborane, triphenylborane, triisobutylborane, tris(pentafluorophenyl)borane, alkylaluminum, trialklyaluminum, trimethylaluminum, triethlyaluminum, triisobutylaluminum, triphenylaluminum, trioctylaluminum, dimethylzinc, diethylzinc, diphenylzinc, or di-n-butylmagnesium. The first reactant can have the structure of formula (III):

(III)

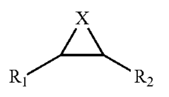

wherein, X is S or O, and each occurrence of $R_1$ and $R_2$ is independently hydrogen or a hydrocarbyl group selected from the group consisting of substituted or unsubstituted monovalent alkyl, alkenyl, arenyl, aryl and aralkyl groups and divalent alkylene, alkenylene, arenylene, arylene and aralkylene groups in which one carbon atom of $R_1$ is covalently bonded to a carbon of $R_2$ to form a cyclic aliphatic structure. The first reactant can be an epoxide selected from the group consisting of ethylene oxide (EO), propylene oxide (PO), 1-butylene oxide (BO), 1-hexene oxide (HO), 1-ocene oxide (OO), glycidyl ethers, glycidyl esters, butyl glycidyl ether (BGE), 2-ethylhexyl glycidyl ether (EHGE), phenyl glycidyl ether (PGE), benzyl glycidyl ether (BzGE), glycidyl azide (GA), allyl glycidyl ether (AGE), styrene oxide (SO), epichlorohydrin (ECH), cyclopentene oxide (CPO), cyclohexene oxide (CHO), 4-vinyl-1-cyclohexene 1,2-epoxide (VCHO), and limonene oxide (LO). The first reactant can be an episulfide selected from the group consisting of ethylene sulfide (EES), propylene sulfide (PES), styrene episulfide (SES), epithiochlorohydrine (ETCH), 1-butylene episulfide (BES), 1-hexene episulfide (HES), 1-ocene episulfide (OES), 2-(butoxymethyl) thiirane (BOMT), 2-(allyloxymethyl) thiirane (AOMT), cyclohexene episulfide (CHES), 2-(benzyloxymethyl) thiirane (BzOMT), and 2-(phenoxymethyl) thiirane (PhOMT). The first heteroallene can have the structure of formula (IV):

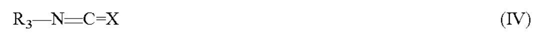

(IV)

wherein $R_3$ is an electro-deficient group and X is an oxygen atom or a sulfur atom. The electro-deficient group can be selected from the group consisting of phenyl, benzoyl, acetyl, trichloroacetyl, allyl, benzenesulfonyl, p-toluenesulfonyl, 4-chlorobenzenesulfonyl, 4-fluorobenzenesulfonyl, chlorosulfonyl, fluorinated phenyl having one to five fluorine atoms located at the ortho-, meta-, or para-position; phenyl having one or more nitro groups located at the ortho-, meta-, or para-position; phenyl having one or more trifluoromethyl groups located at the ortho-, meta-, or para-position, and phenyl having two or more different substitutions selected from the group consisting of halogen atoms, fluorine atoms, nitro groups, trifluoromethyl groups, aromatic groups, cyclic alkyl groups, and heteroatom-containing alkyl groups. The first heteroallene can be an isocyanate selected from the group consisting of trichloroacetyl isocyanate (TCAI), chlorosulfonyl isocyanate (CSI), benzenesulfonyl isocyanate (BSI), p-toluenesulfonyl isocyanate (TSI), 4-chlorobenzenesulfonyl isocyanate (CBSI), 4-nitrophenyl isocyanate (NPI), 4-trifluoromethylphenyl isocyanate (TFMPI), 4-fluorophenyl isocyanate (FPI), pentafluorophenyl isocyanate (PFPI), and 3,5-bis(trifluoromethyl)-phenyl isocyanate (BTFMPI). The first heteroallene can be an isothiocyanate selected from the group consisting of phenyl isothiocyanate (PIT), benzoyl isothiocyanate (BzIT), 4-fluorophenyl isothiocyanate (FPIT), 4-nitrophenyl isothiocyanate (NPIT), 4-trifluoromethylphenyl isothiocyanate (TFMPIT), allyl isothiocyanate (AIT), acetyl isothiocyanate (AcIT), ethoxycarbonyl isothiocyanate (EOCIT), pentafluorophenyl isothiocyanate (PFPIT), and 3,5-bis(trifluoromethyl)-phenyl isothiocyanate (BTFMPIT). The molar ratio of the first reactant to the additional reactant is within a range of about 1:20 to about 20:1. The method can further include contacting the reactants with an initiator, optionally selected from the group consisting of salts having an halide, carboxylate, or alkoxide anion, and a tetraalkylammonium, tetraalkylphosphonium, or phosphazenium cation. The initiator can be selected from the group consisting of tetrabutylammonium chloride (TBACl), Bis(tripheylphosphoranylidne)-ammonium chloride (PPNCl), tetraoctylammonium chloride (TOACl), Bis(tripheylphosphoranylidne)-ammonium acetate (PPNAc), 1,4-dihydroxylmethyl benzene/$P_4$-t-Bu (DHMB/$P_4$-t-Bu), tetrabutylammonium butanolate (TBABO), hydroxylmethyl benzene/$P_4$-t-Bu (HMB/$P_4$-t-Bu), and tetrabutylammonium succinate (TBAS). The molar ratio of Lewis acid to initiator can be within a range of about 0.5:1 to 4:1. The one or more additional reactants can further include a second heteroallene selected from the group consisting of carbon dioxide, carbon disulfide, and carbonyl sulfide. The molar ratio of the first reactant to the first heteroallene to the second heteroallene is within a range of about 1-10:1-10:1-10. The contacting step can include adding the first reactant and the one or more additional reactants to a reaction vessel concomitantly or sequentially, optionally wherein the first heteroallene and a second heteroallene are added concomitantly or sequentially. The contacting step can be performed at a temperature within a range of about 0° C. to about 80° C., optionally about 20° C. to about 60° C. The contacting step can be performed for a duration of about 4 hours to about 20 hours, optionally about 12 hours.

In another aspect, the present disclosure also features a polycarbamate copolymer obtained by the method of one or more of the embodiments described above for the second aspect.

In another aspect, the present disclosure features a composition for synthesizing a polycarbamate by chain-growth copolymerization comprising: a Lewis acid; a first reactant comprising an oxirane or thiirane moiety; and one or more additional reactants selected from heteroallenes, wherein a first heteroallene is selected from the group consisting of isocyanates and isothiocyanates. The Lewis acid, first reactant, and one or more additional reactants can be selected from the groups described for the second aspect. For example, the Lewis acid can be a non-metal Lewis acid. The Lewis acid can be selected from the group consisting of borane-, aluminum-, magnesium- and zinc-based Lewis acids. The Lewis acid can be an alkylborane, trialkylborane, triethylborane, triphenylborane, triisobutylborane, tris(pentafluorophenyl)borane, alkylaluminum, trialklyaluminum, trimethylaluminum, triethlyaluminum, triisobutylaluminum, triphenylaluminum, trioctylaluminum, dimethylzinc, diethylzinc, diphenylzinc, or di-n-butylmagnesium. The first reactant can have the structure of formula (III):

(III)

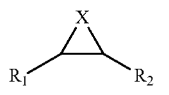

wherein, X is S or O, and each occurrence of $R_1$ and $R_2$ is independently hydrogen or a hydrocarbyl group selected from the group consisting of substituted or unsubstituted monovalent alkyl, alkenyl, arenyl, aryl and aralkyl groups and divalent alkylene, alkenylene, arenylene, arylene and aralkylene groups in which one carbon atom of $R_1$ is covalently bonded to a carbon of $R_2$ to form a cyclic aliphatic structure. The first reactant can be an epoxide selected from the group consisting of ethylene oxide (EO), propylene oxide (PO), 1-butylene oxide (BO), 1-hexene oxide (HO), 1-ocene oxide (OO), glycidyl ethers, glycidyl esters, butyl glycidyl ether (BGE), 2-ethylhexyl glycidyl ether (EHGE), phenyl glycidyl ether (PGE), benzyl glycidyl ether (BzGE), glycidyl azide (GA), allyl glycidyl ether (AGE), styrene oxide (SO), epichlorohydrin (ECH), cyclopentene oxide (CPO), cyclohexene oxide (CHO), 4-vinyl-1-cyclohexene 1,2-epoxide (VCHO), and limonene oxide (LO). The first reactant can be an episulfide selected from the group consisting of ethylene sulfide (EES), propylene sulfide (PES), styrene episulfide (SES), epithiochlorohydrine (ETCH), 1-butylene episulfide (BES), 1-hexene episulfide (HES), 1-ocene episulfide (OES), 2-(butoxymethyl) thiirane (BOMT), 2-(allyloxymethyl) thiirane (AOMT), cyclohexene episulfide (CHES), 2-(benzyloxymethyl) thiirane (BzOMT), and 2-(phenoxymethyl) thiirane (PhOMT). The first heteroallene can be represented by formula (IV):

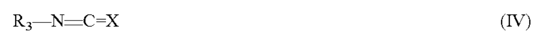

$$R_3—N{=}C{=}X \quad (IV)$$

wherein $R_3$ is an electro-deficient group and X is an oxygen atom or a sulfur atom. The electro-deficient group can be selected from the group consisting of phenyl, benzoyl, acetyl, trichloroacetyl, allyl, benzenesulfonyl, p-toluenesulfonyl, 4-chlorobenzenesulfonyl, 4-fluorobenzenesulfonyl, chlorosulfonyl, fluorinated phenyl having one to five fluorine atoms located at the ortho-, meta-, or para-position; phenyl having one or more nitro groups located at the ortho-, meta-, or para-position; phenyl having one or more trifluoromethyl groups located at the ortho-, meta-, or para-position, and phenyl having two or more different substitutions selected from the group consisting of halogen atoms, fluorine atoms, nitro groups, trifluoromethyl groups, aromatic groups, cyclic alkyl groups, and heteroatom-containing alkyl groups. The composition can further include a second heteroallene selected from the group consisting of carbon dioxide, carbon disulfide and carbonyl sulfide. In addition, the composition can further include an initiator, which can be selected from the group consisting of salts having an halide, carboxylate, or alkoxide anion, and a tetraalkylammonium, tetraalkylphosphonium, or phosphazenium cation. The initiator can be selected from the group consisting of tetrabutylammonium chloride (TBACl), Bis(tripheylphosphoranylidne)-ammonium chloride (PPNCl), tetraoctylammonium chloride (TOACl), Bis(tripheylphosphoranylidne)-ammonium acetate (PPNAc), 1,4-dihydroxylmethyl benzene/$P_4$-t-Bu (DHMB/$P_4$-t-Bu), tetrabutylammonium butanolate (TBABO), hydroxylmethyl benzene/$P_4$-t-Bu (HMB/$P_4$-t-Bu), and tetrabutylammonium succinate (TBAS). The composition can further include a solvent selected from the group of organic solvents consisting of a heterocyclic compounds, hydrocarbons, aromatic hydrocarbons, aliphatic hydrocarbons, halogenated hydrocarbons, ethers, esters, ketones, hexane, tetrahydrofuran, toluene, methylene chloride, chloroform, 1,2-dichloroethane, propylene carbonate, acetonitrile, dimethylformamide, N-methyl-2-pyrrolidone, dimethyl sulfoxide, 1,4-Dioxane, and 1,3-Dioxane.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. The drawings illustrate generally, by way of example, but not by way of limitation, various embodiments discussed in the present document.

Reference is made to illustrative embodiments that are depicted in the figures, in which:

FIG. 2 shows Table 1 with representative data for Lewis acid assisted copolymerization of epoxides or episulfides with heteroallenes, according to one or more embodiments of the present disclosure. [a]Polymerizations were carried out at room temperature over a period of 12 hours. [b]Calculated by gravimetry. [c]Determined from $^1$H NMR of pure product. [d]Determined by GPC with THF as eluent and calibrated by polystyrene standard.

FIG. 9 shows Table 2 with representative data for the trialkylborane-mediated copolymerization of epoxides with p-tosyl isocyanate, according to one or more embodiments of the present disclosure. [a]The reactions were run at 25° C. for 12 hours using THF as the solvent unless otherwise noted. [b]Determined from $^1$H NMR spectra of the purified polymer. [c]Yield=weight of polymer obtained/theoretical weight of an alternating polymer at full conversion×100%. [d]Theoretical molar mass=(58.1+197.2)×(E/I)×yield. [e]Determined by GPC at 35° C. using THF as the solvent and polystyrene standard. [f]The reaction was conducted at 60° C. [g]The polymerization proceeded explosively. [h]Not detected due to solubility problem.

FIG. 29 shows Table 3 with results for Lewis acid assisted terpolymerization of epoxides or episulfides with two heteroallenes, according to one or more embodiments of the present disclosure. [a] Polymerizations were carried out at 60° C. over a period of 12 hours. [b]Determined from $^1$H NMR spectrum of pure product. C Determined by GPC with THF as eluent and calibrated by polystyrene standard.

DETAILED DESCRIPTION

Figure 1:
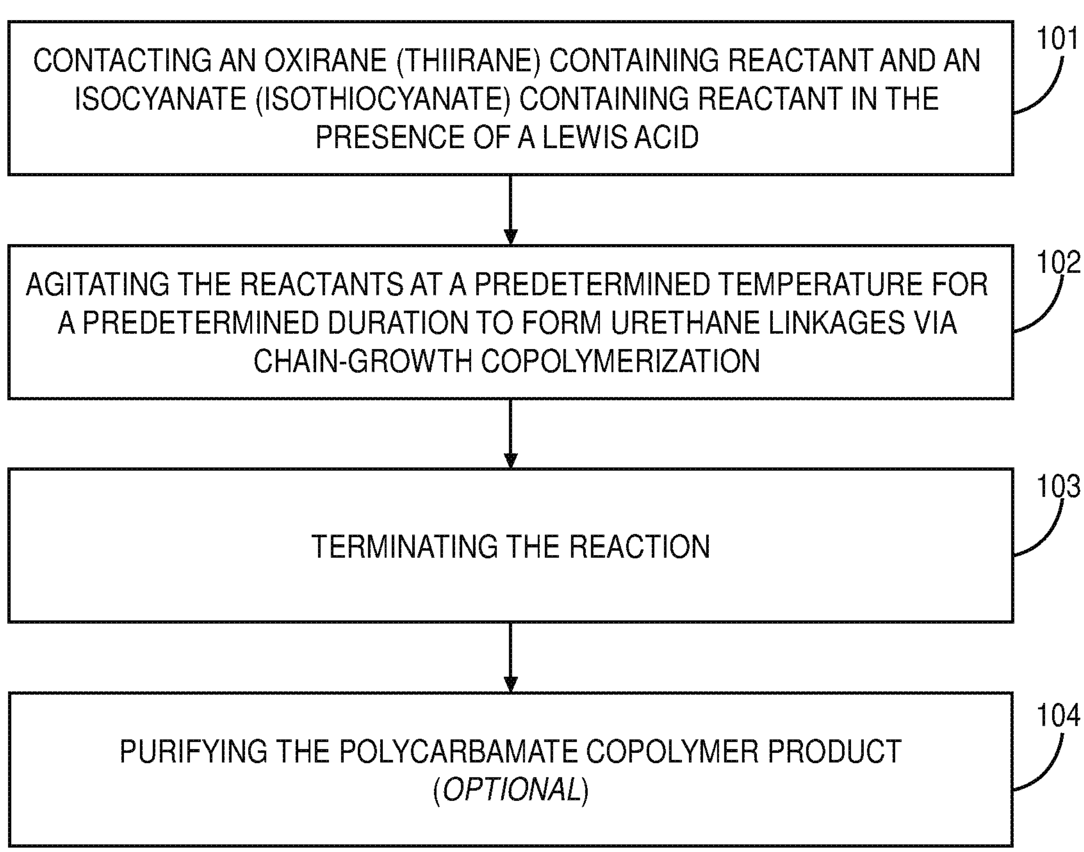
FIG. 1 is a flowchart describing method 100 for copolymerizing carbamates (e.g., polyurethanes and polythiourethanes), according to one or more embodiments of the present disclosure.
Figure 3:
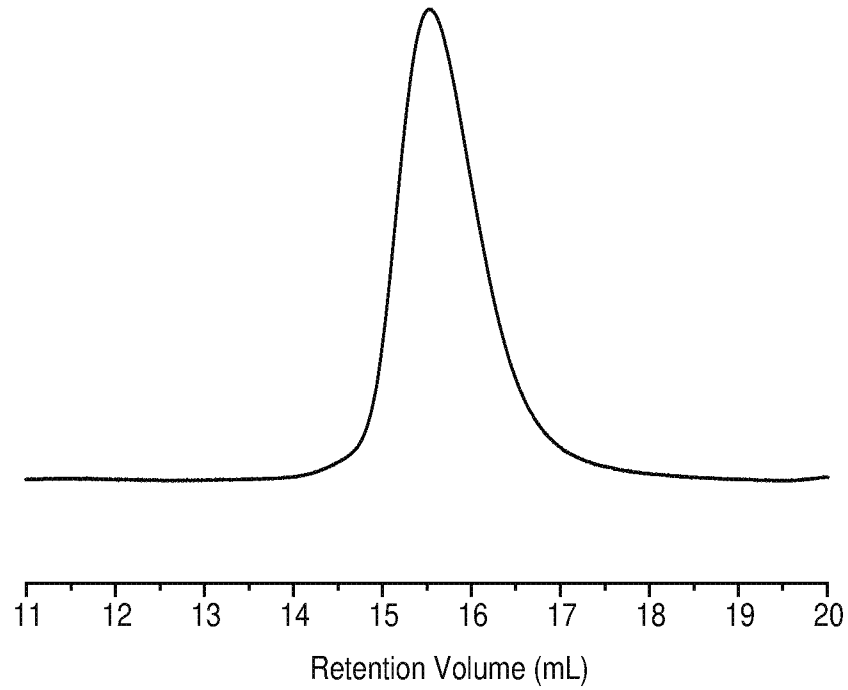
FIG. 3 is a Gel permeation chromatograph (GPC) trace of a polymer (Entry 1, Table 1) according to one or more embodiments of the present disclosure, in Tetrahydrofuran (THF).
Figure 4:
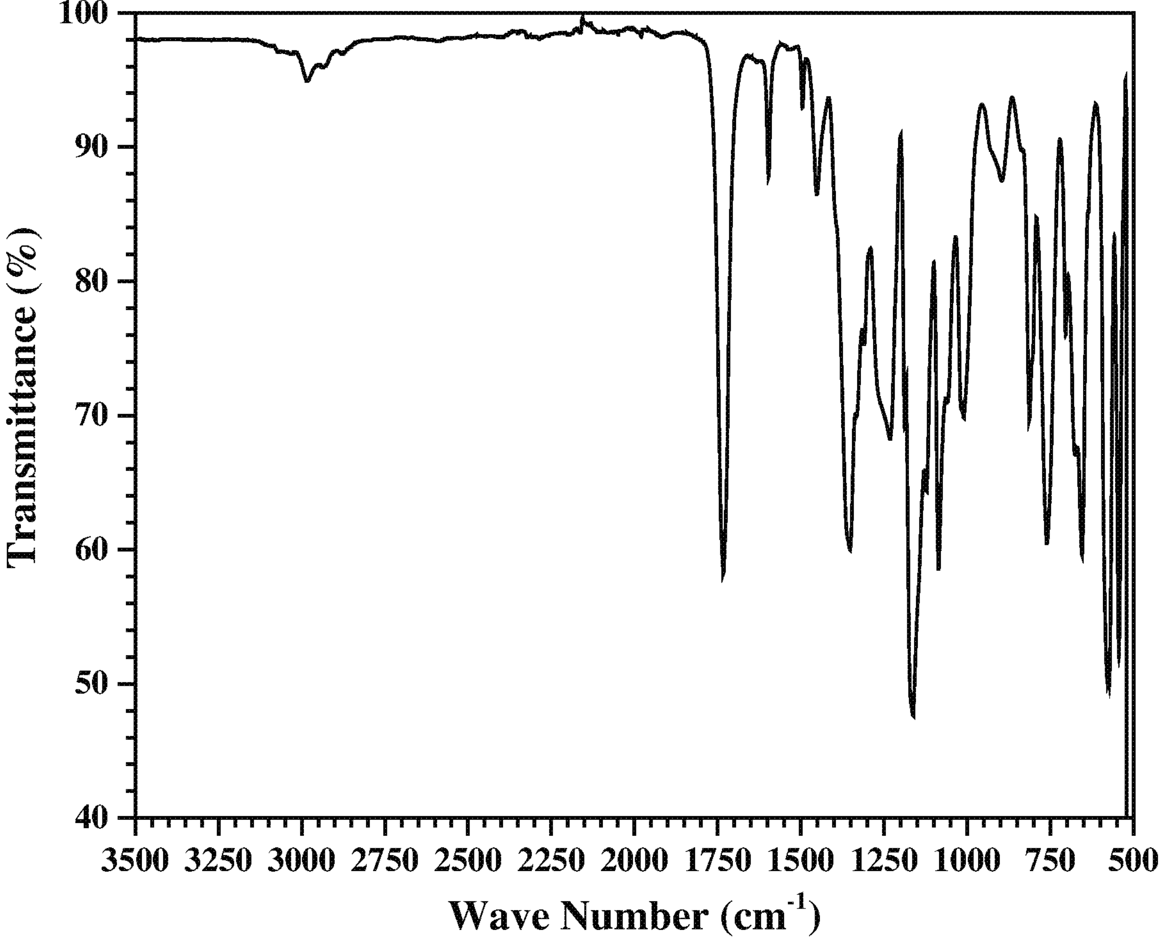
FIG. 4 is a Fourier Transform-Infrared Spectroscopy (FTIR) spectrum of the polymer (Entry 1, Table 1) according to one or more embodiments of the present disclosure.
Figure 5:
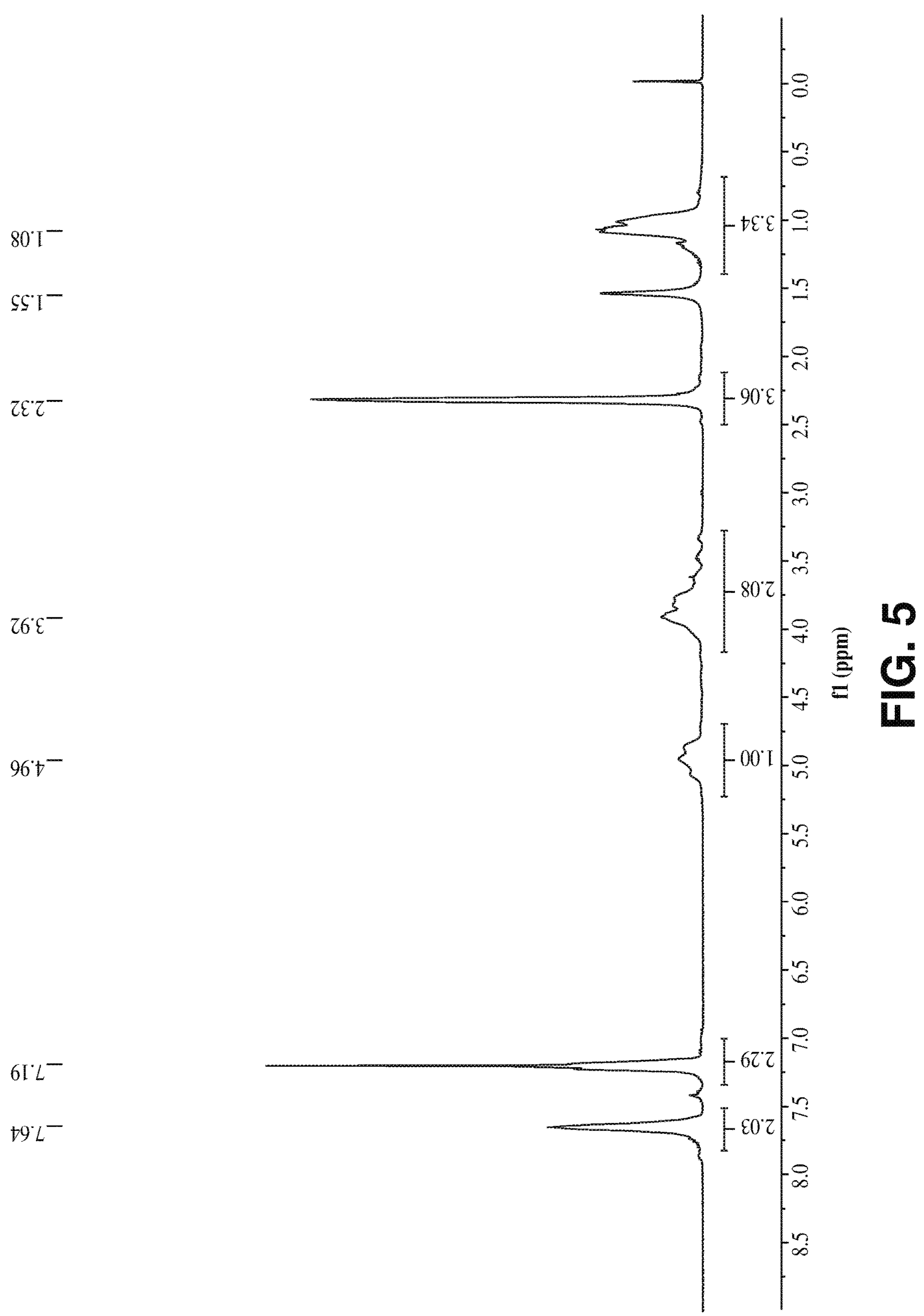
FIG. 5 is a $^1$H NMR of the polymer (Entry 1, Table 1) according to one or more embodiments of the present disclosure, in $CDCl_3$.
Figure 6:
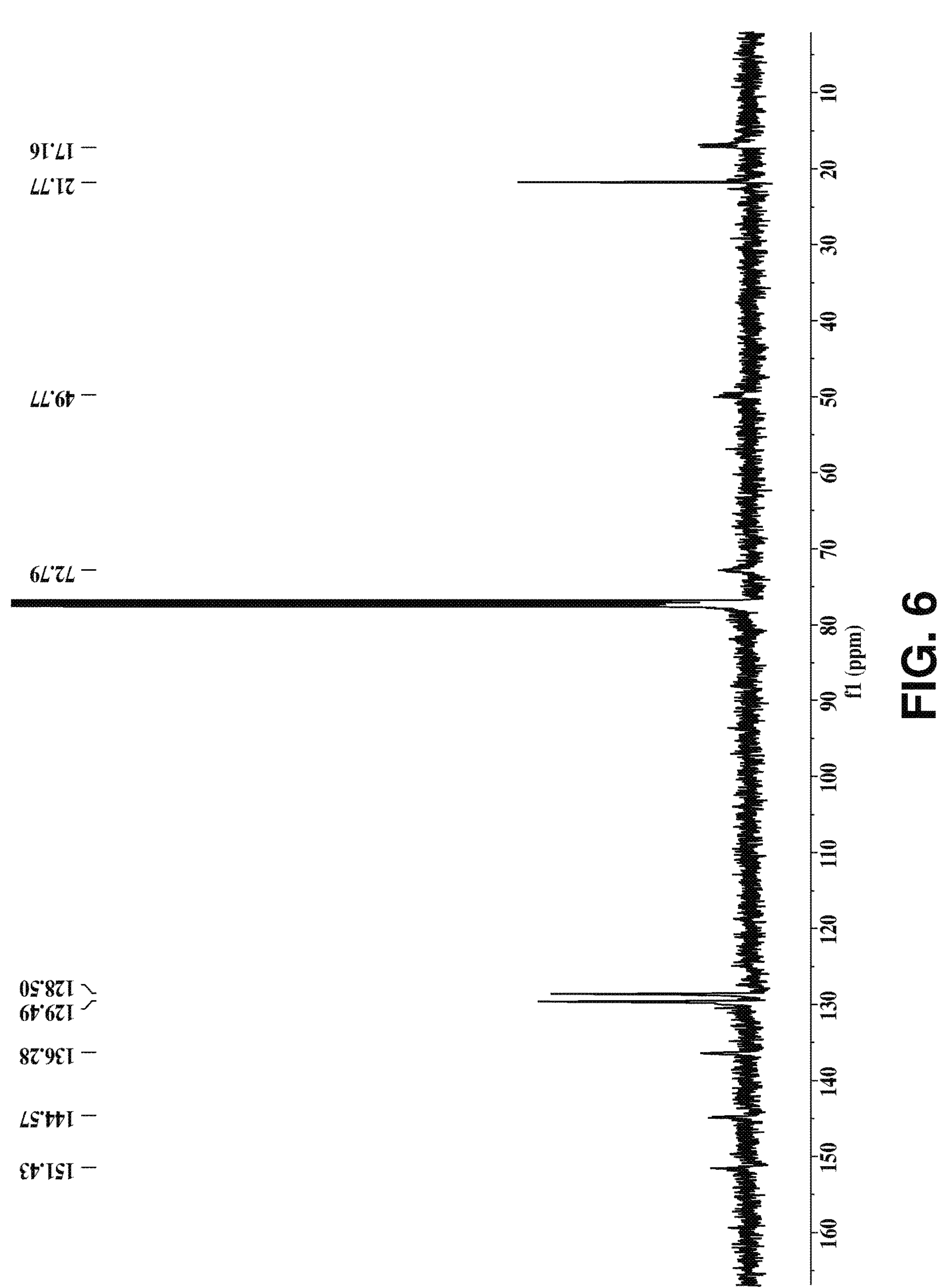
FIG. 6 is a $^{13}$C NMR of the polymer (Entry 1, Table 1) according to one or more embodiments of the present disclosure, in $CDCl_3$.
Figure 7:
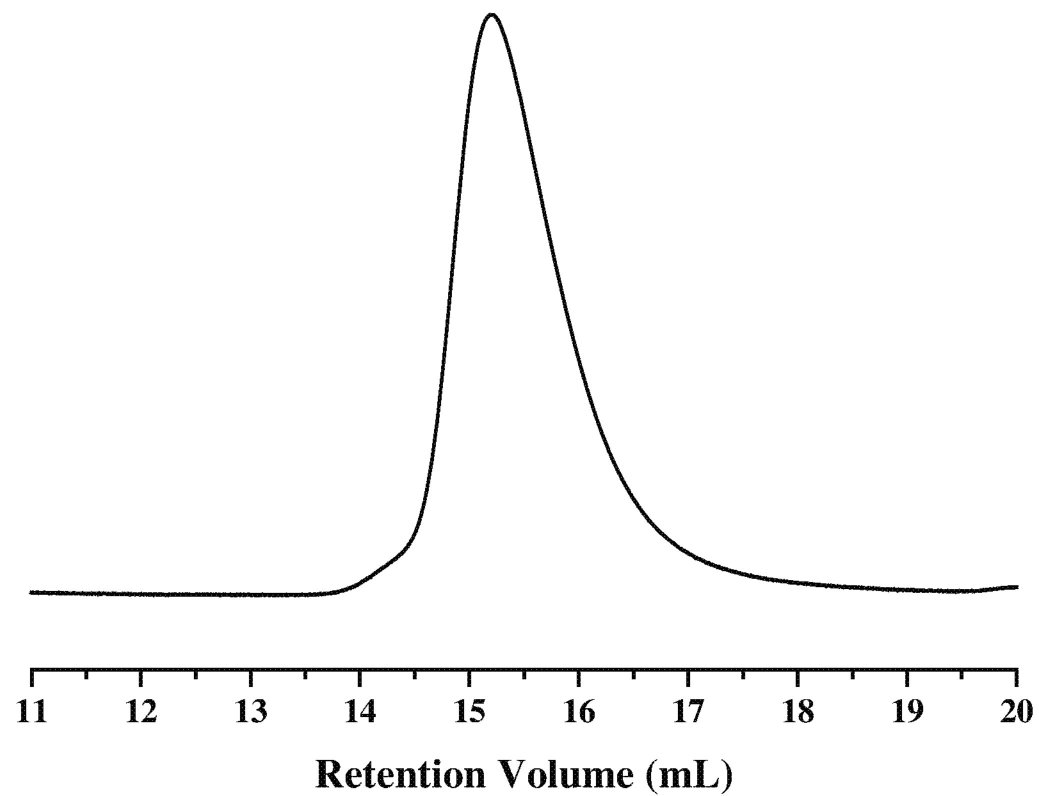
FIG. 7 is a GPC trace of a polymer (Entry 2, Table 1), according to one or more embodiments of the present disclosure, in THF.
Figure 8:
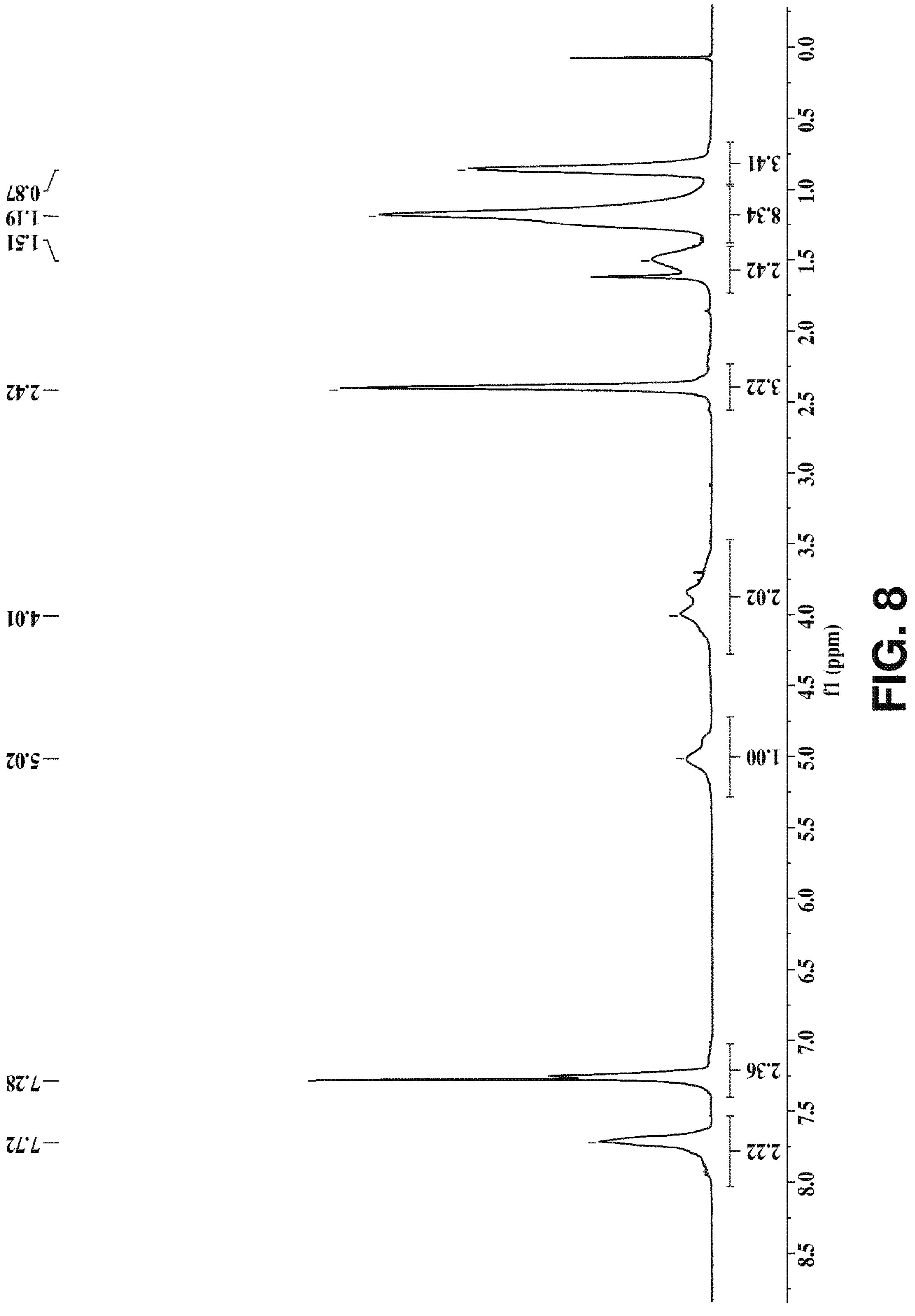
FIG. 8 is a $^1$H NMR of the polymer (Entry 2, Table 1) according to one or more embodiments of the present disclosure, in $CDCl_3$.
Figure 10:
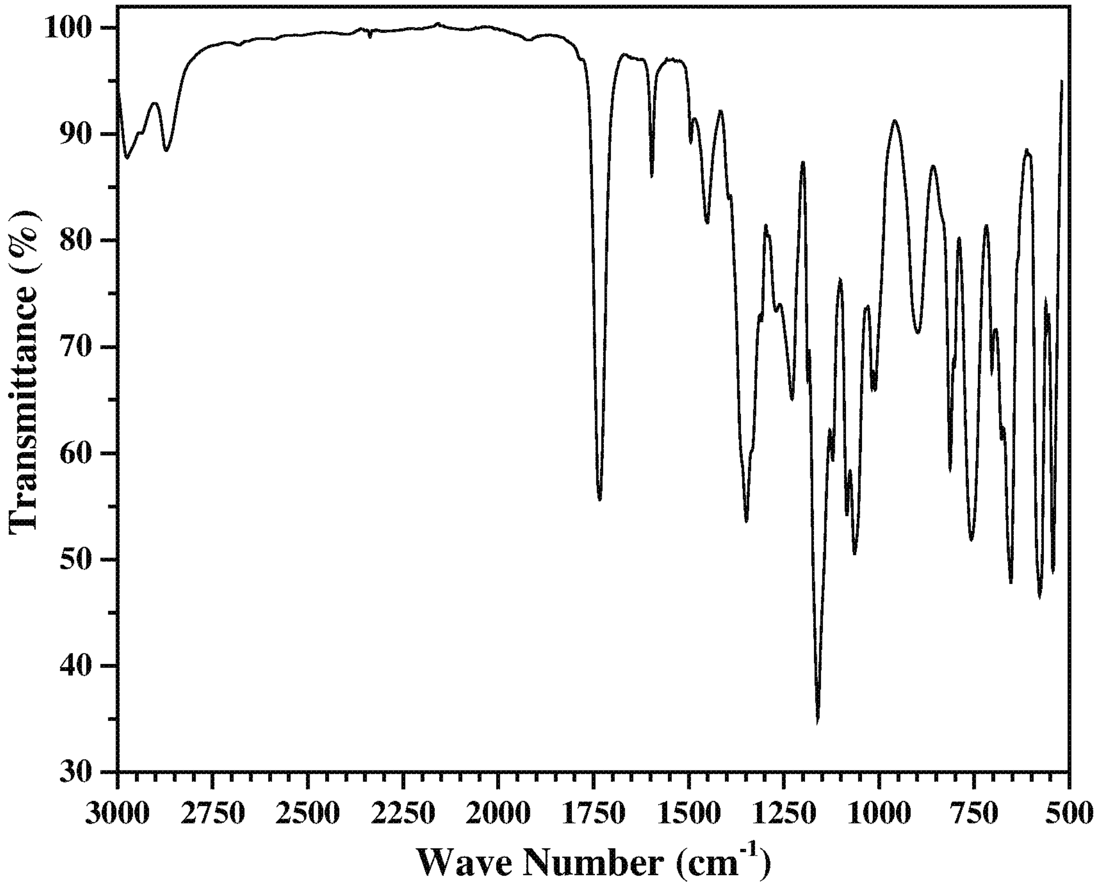
FIG. 10 is a FTIR spectrum for a polymer (Entry 2, Table 2), according to one or more embodiments of the present disclosure.
Figure 11:
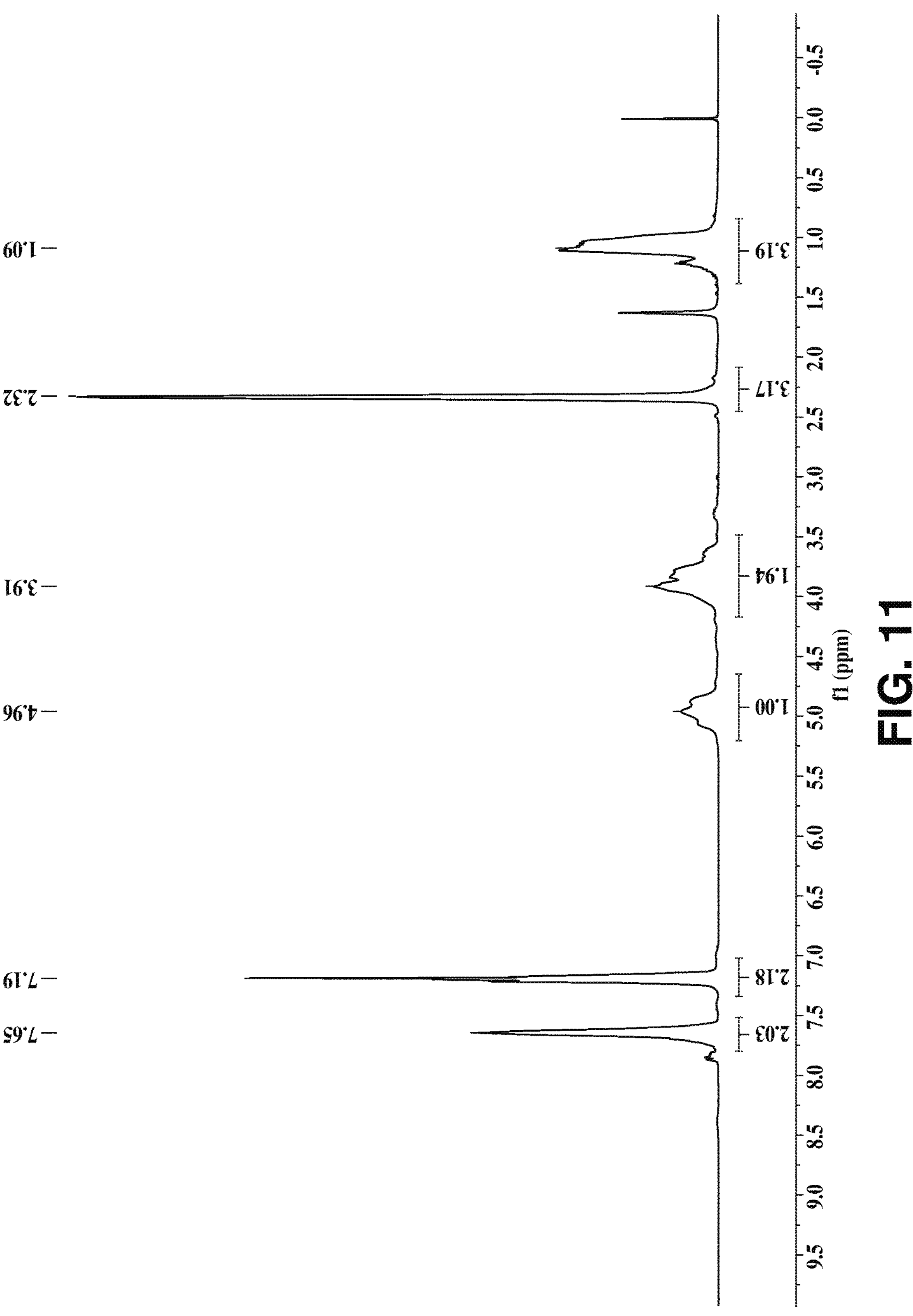
FIG. 11 is a $^1$H NMR spectrum for the polymer (Entry 2, Table 2) according to one or more embodiments of the present disclosure in $CDCl_3$.
Figure 12:
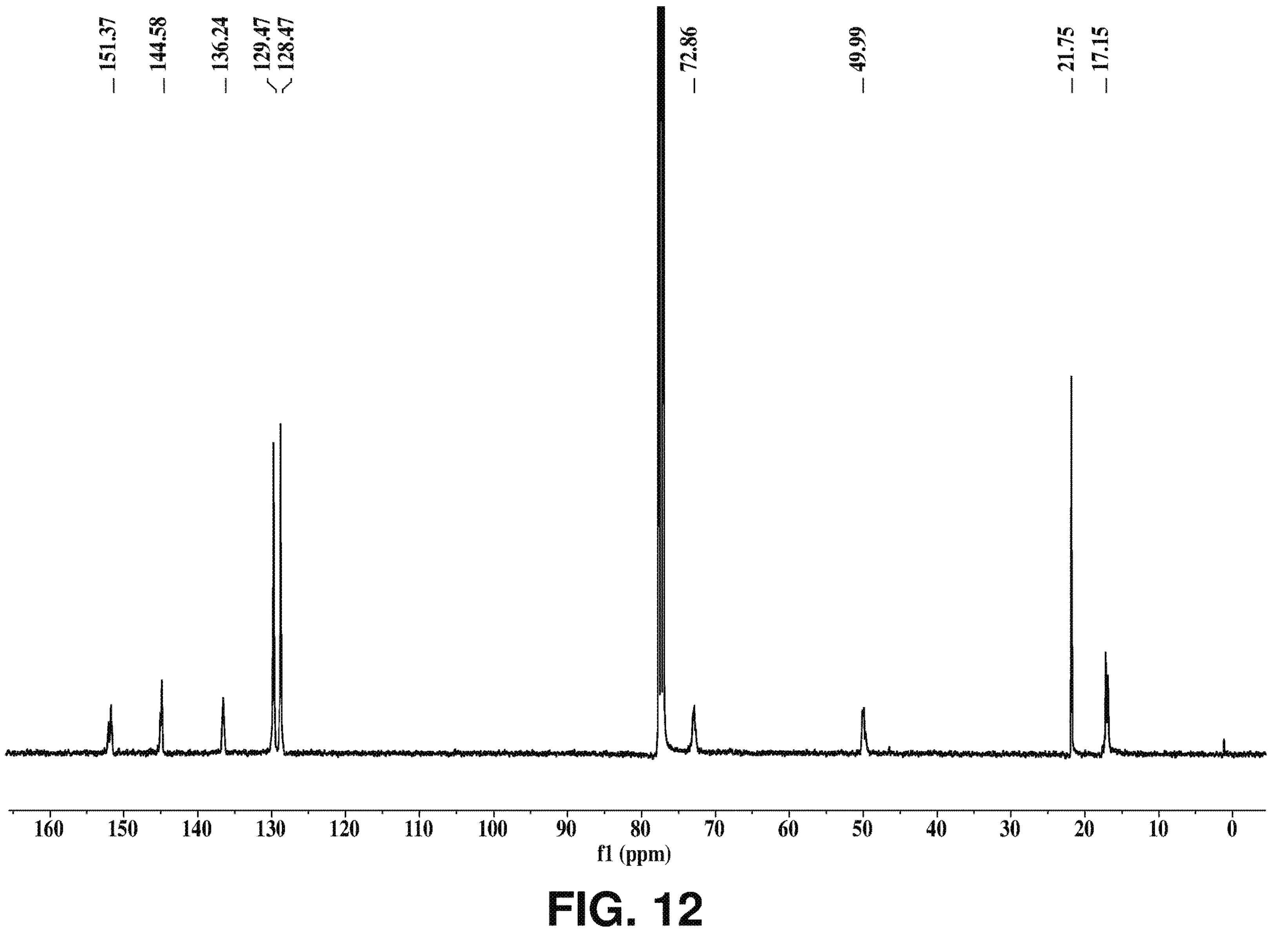
FIG. 12 is a $^{13}$C NMR spectrum for the polymer (Entry 2, Table 2) according to one or more embodiments of the present disclosure, in $CDCl_3$.
Figure 13:
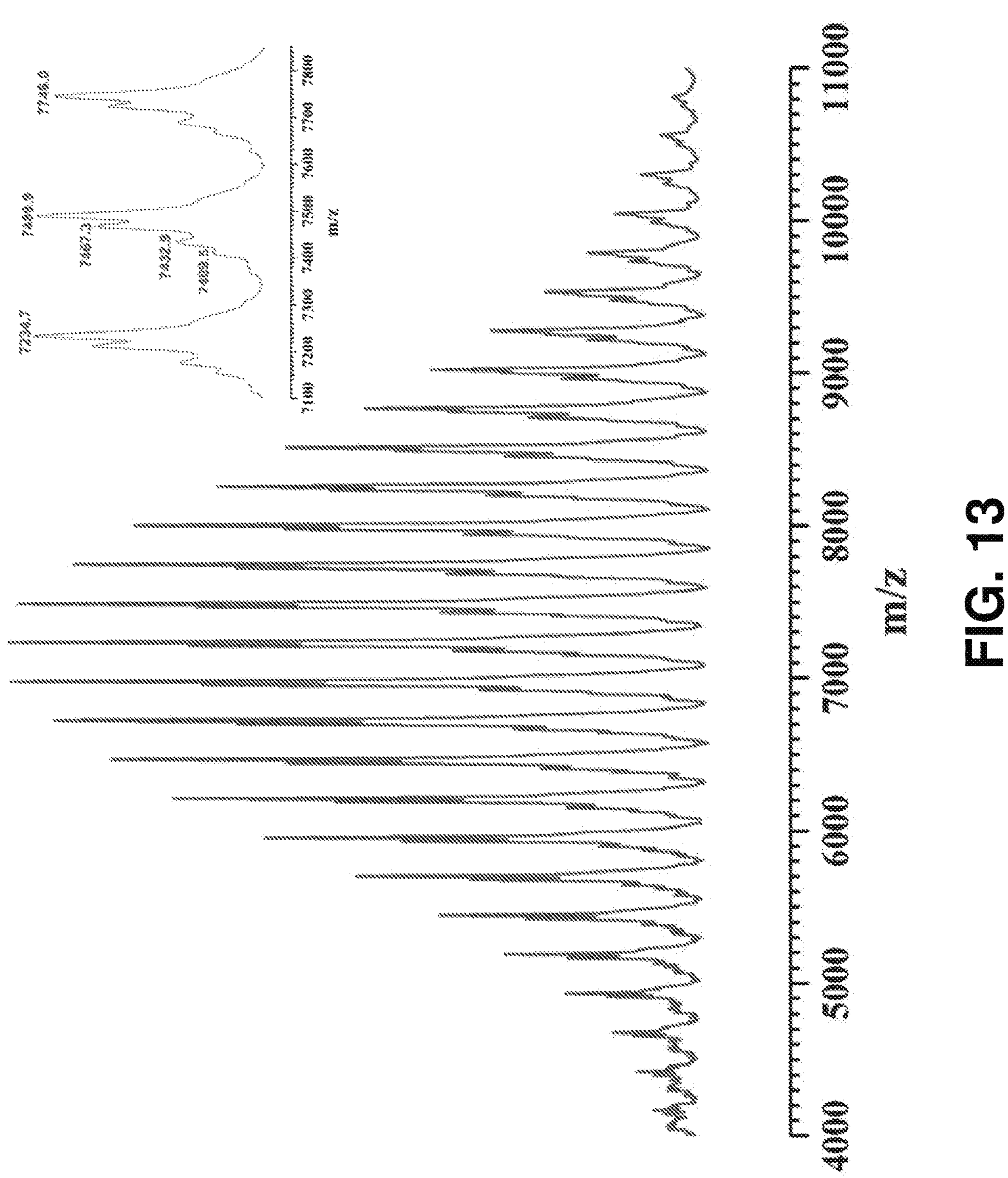
FIG. 13 is a MALDI-TOF mass spectrum for the polymer (Entry 2, Table 2) according to one or more embodiments of the present disclosure.
Figure 14:
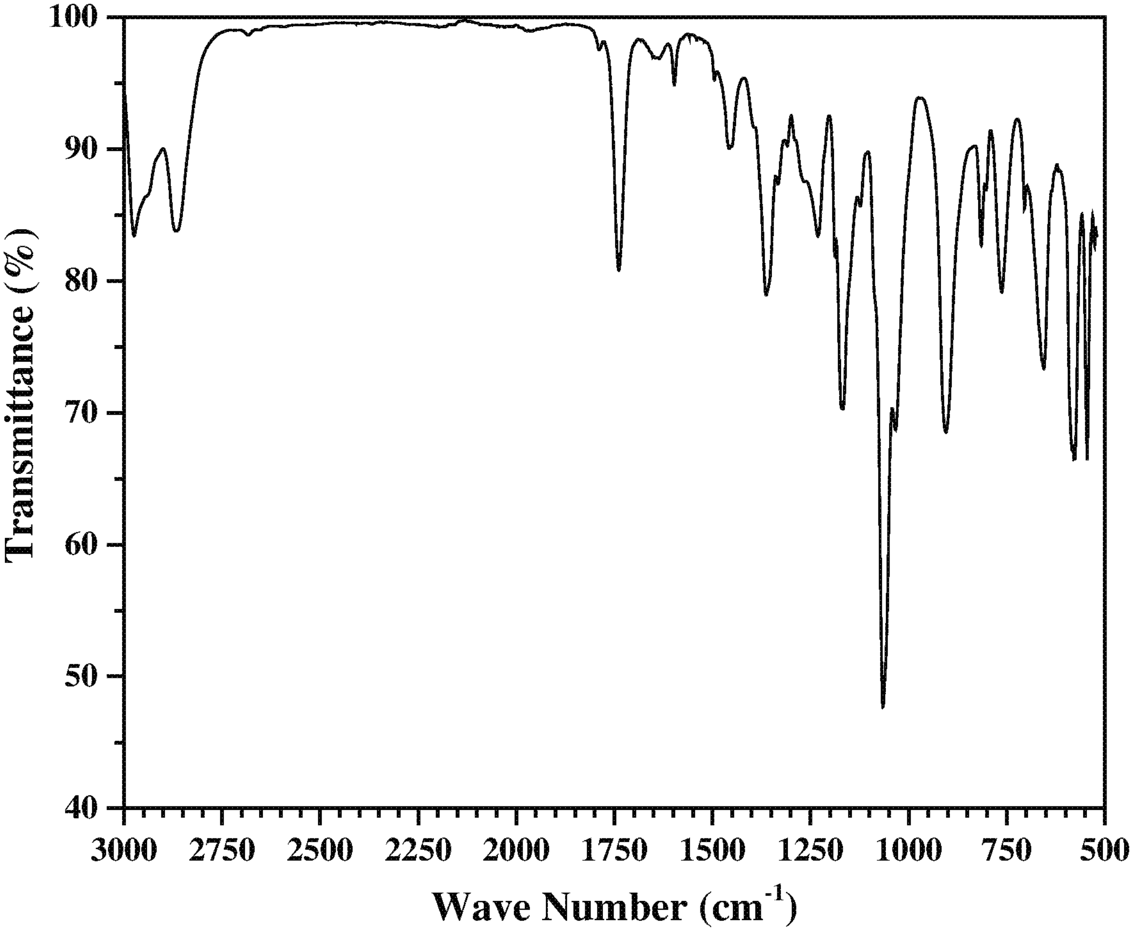
FIG. 14 is a FTIR spectrum for a polymer (Entry 4, Table 2), according to one or more embodiments of the present disclosure.
Figure 15:
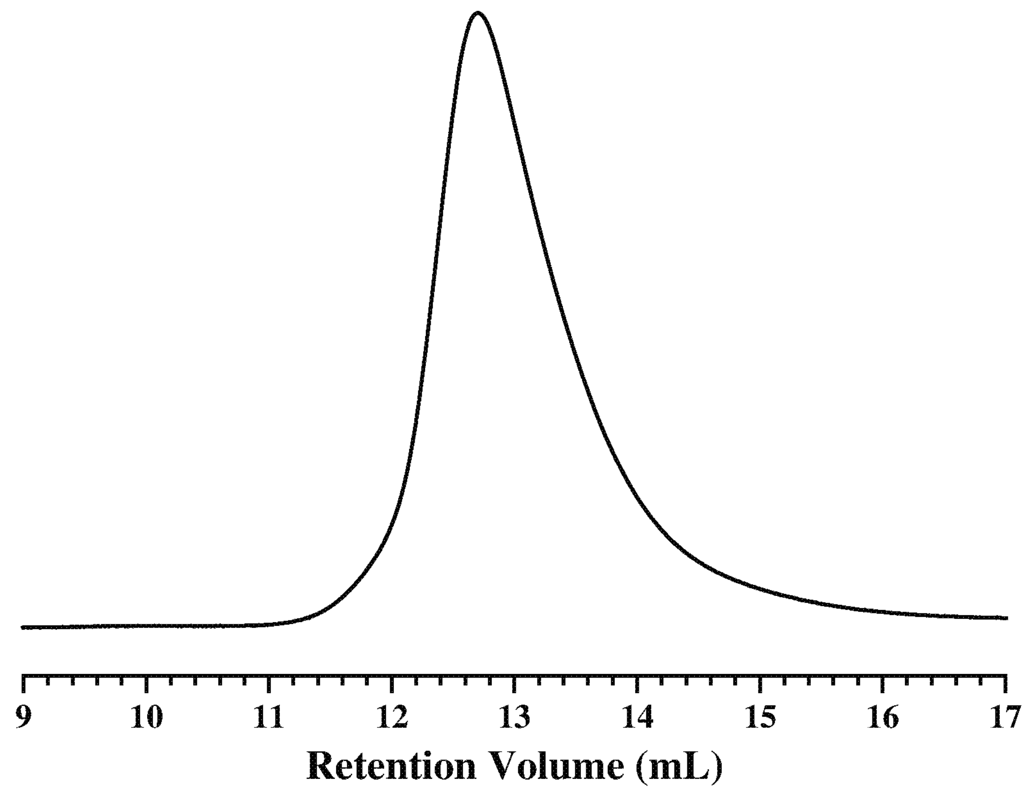
FIG. 15 is a GPC trace for the polymer (Entry 4, Table 2) according to one or more embodiments of the present disclosure in THF.
Figure 16:
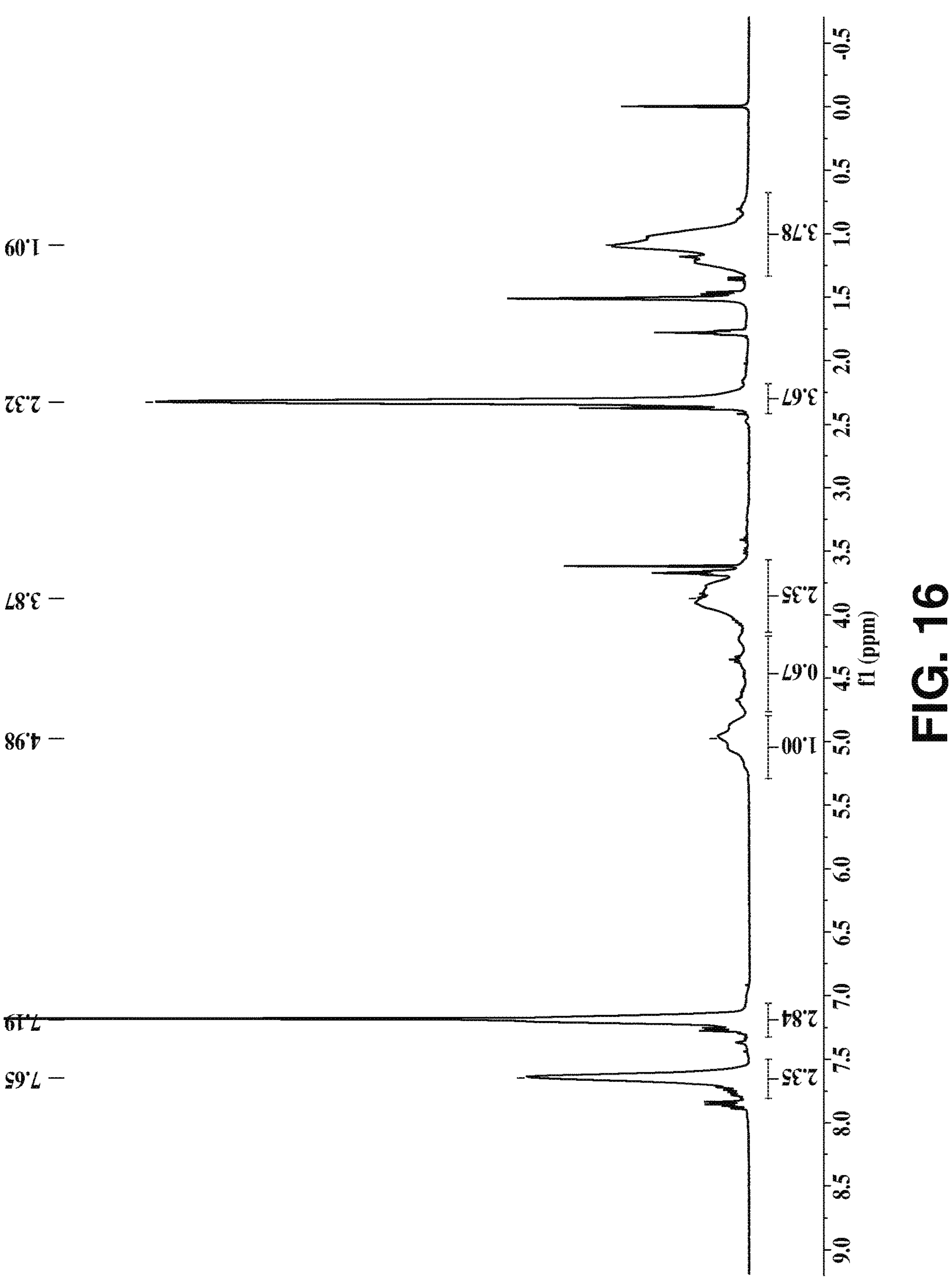
FIG. 16 is a $^1$H NMR spectrum for the polymer (Entry 4, Table 2), according to one or more embodiments of the present disclosure, in $CDCl_3$.
Figure 17:
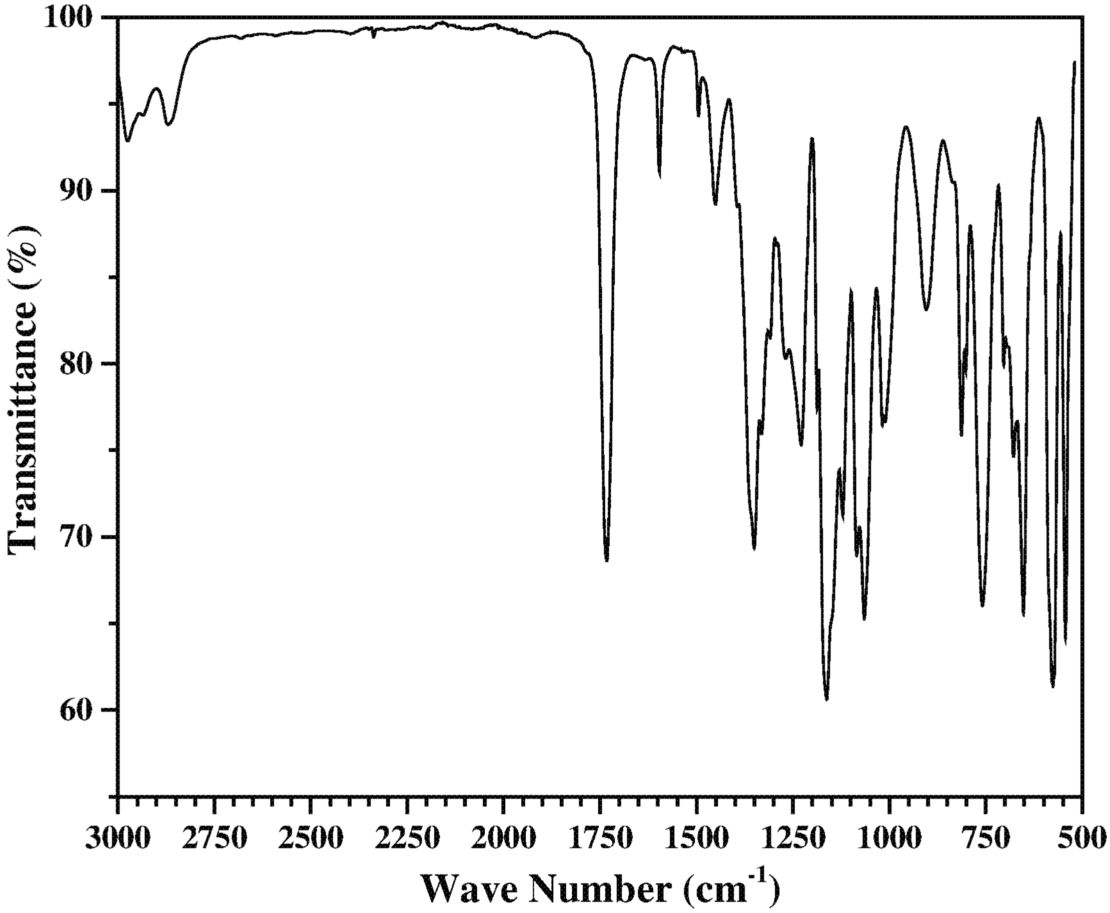
FIG. 17 is a FTIR spectrum for a polymer (Entry 5, Table 2), according to one or more embodiments of the present disclosure.
Figure 18:
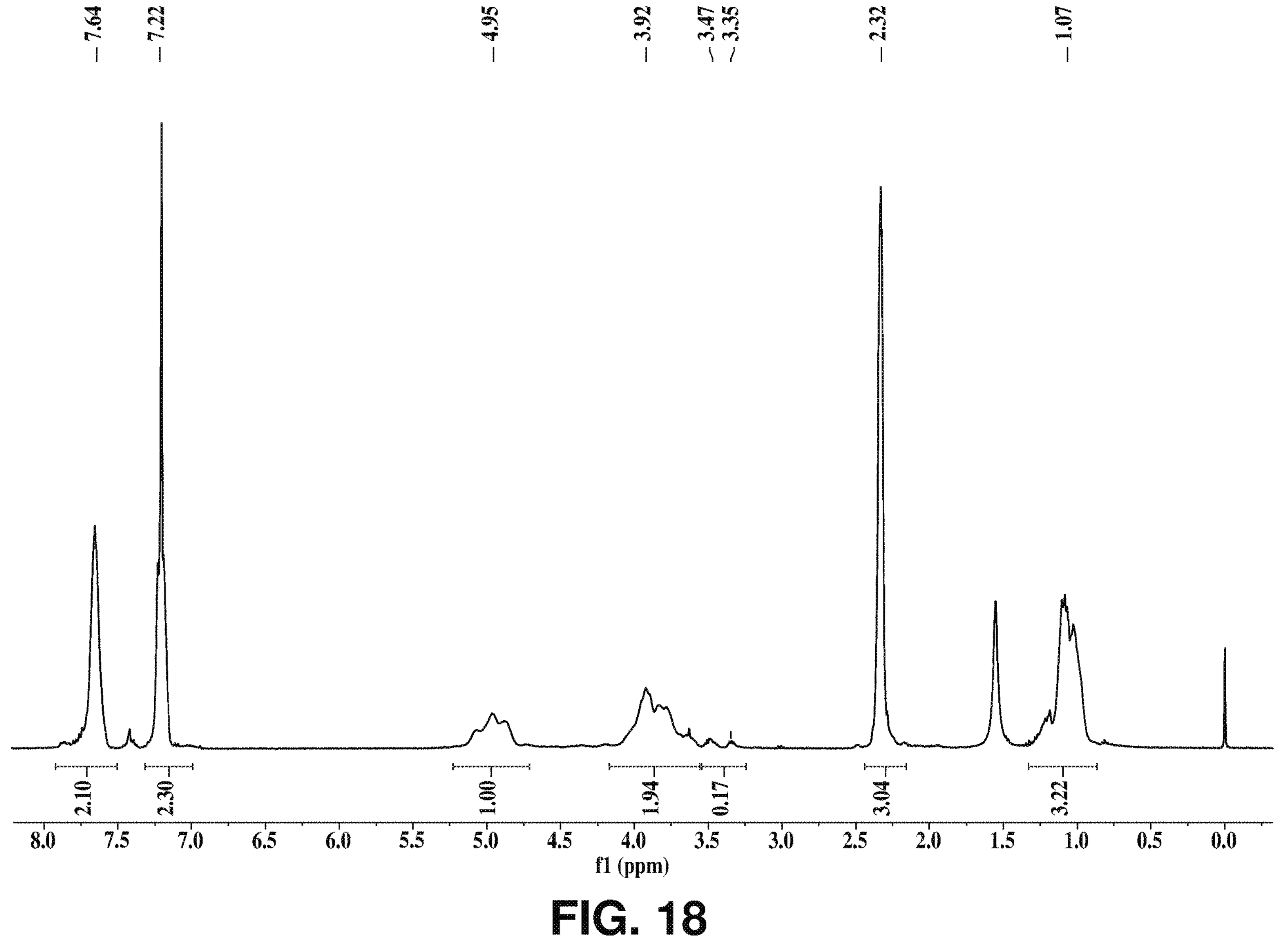
FIG. 18 is a $^1$H NMR spectrum of the polymer (Entry 5, Table 2), according to one or more embodiments of the present disclosure, in $CDCl_3$.
Figure 19:
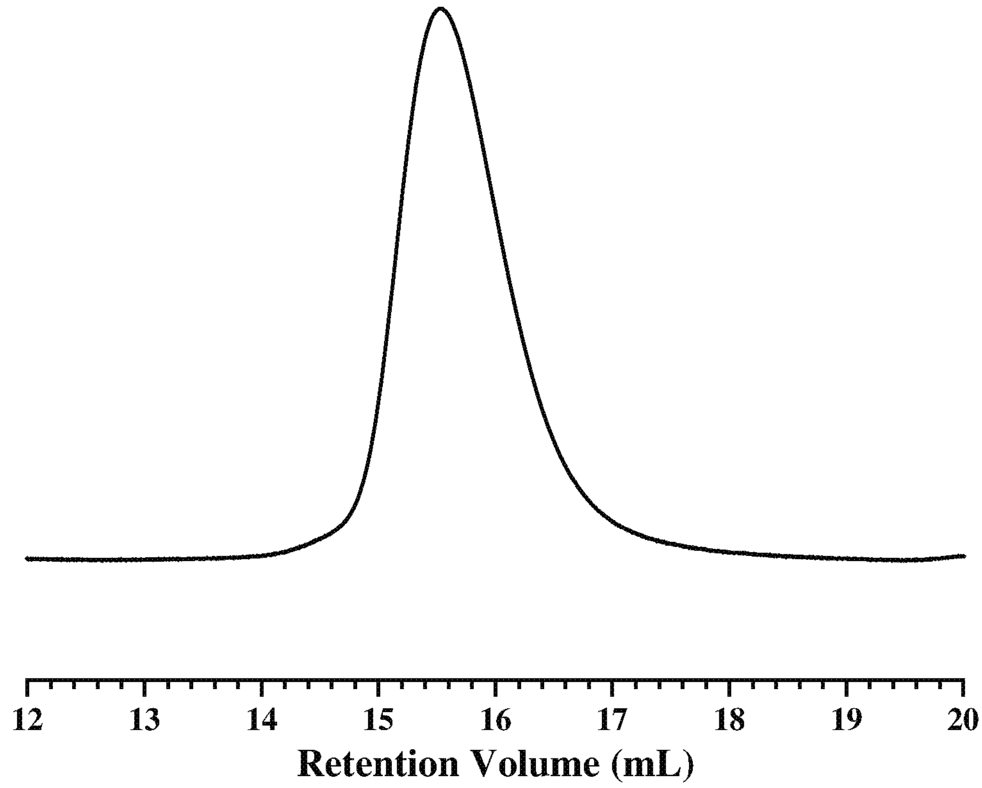
FIG. 19 is a GPC trace for the polymer (Entry 5, Table 2) according to one or more embodiments of the present disclosure, in THF.
Figure 20:
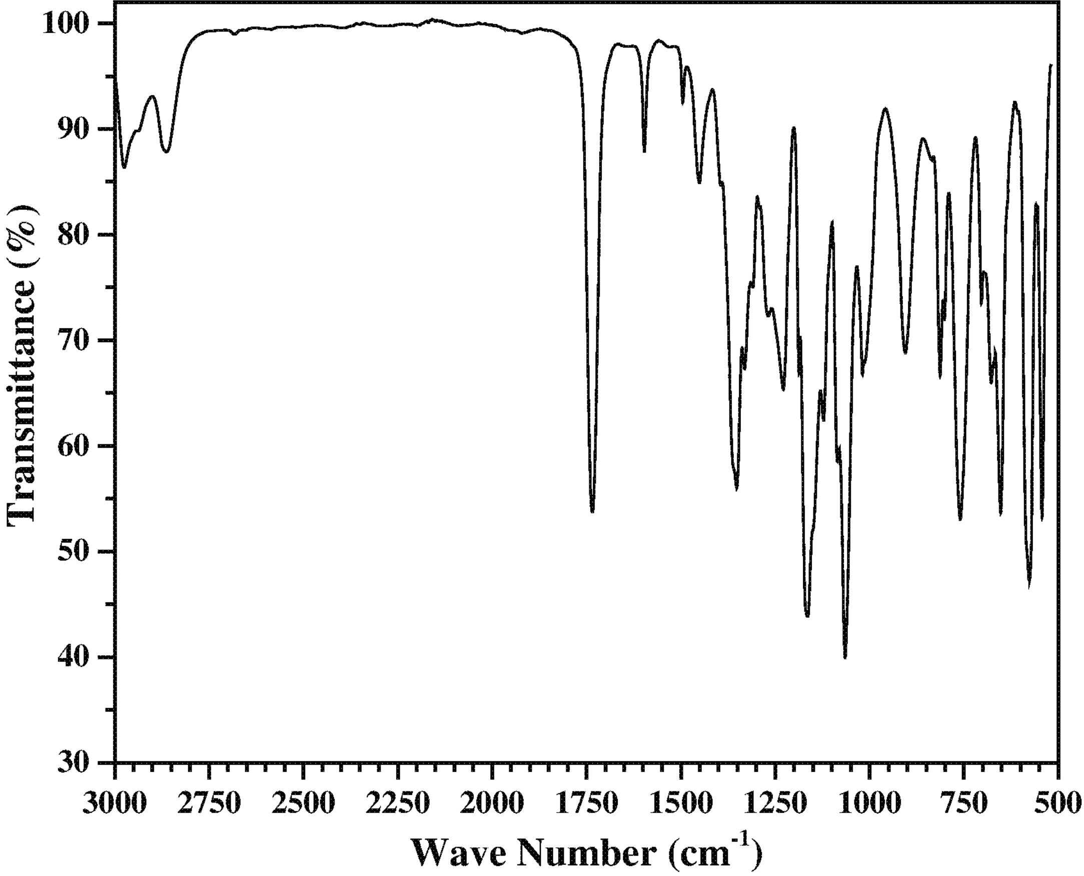
FIG. 20 is a FTIR spectrum for a polymer (Entry 8, Table 2), according to one or more embodiments of the present disclosure.
Figure 21:
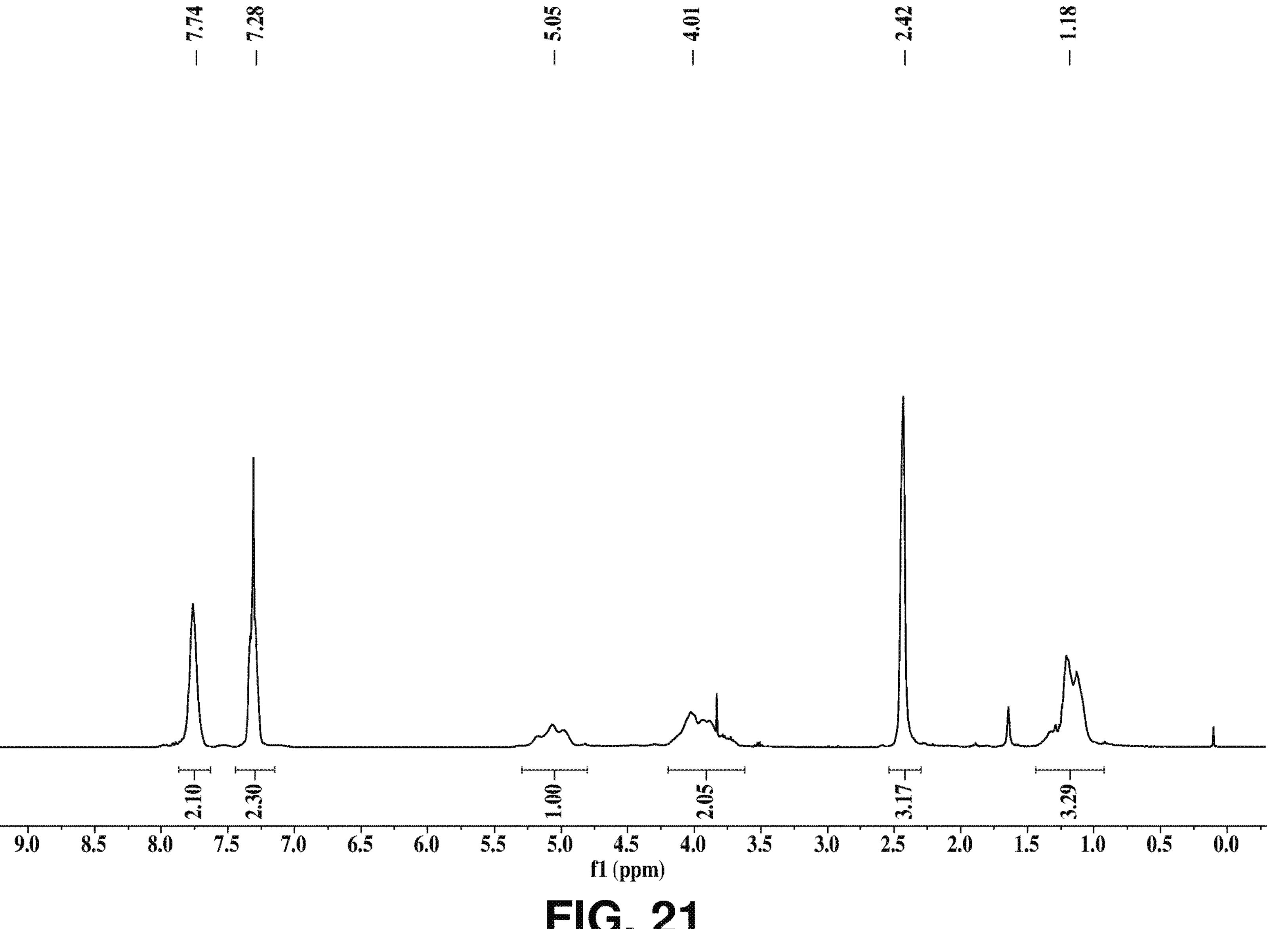
FIG. 21 is a $^1$H NMR spectrum of the polymer (Entry 8, Table 2) according to one or more embodiments of the present disclosure, in $CDCl_3$.
Figure 22:
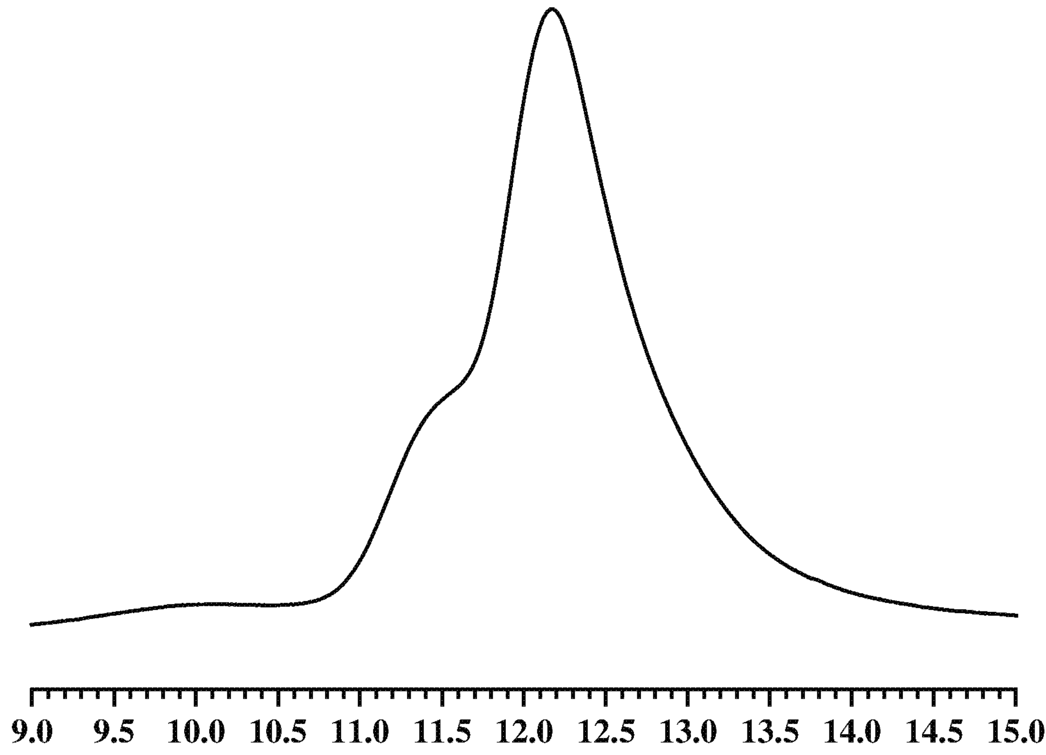
FIG. 22 is a GPC trace for the polymer (Entry 8, Table 2) according to one or more embodiments of the present disclosure, in THF.
Figure 23:
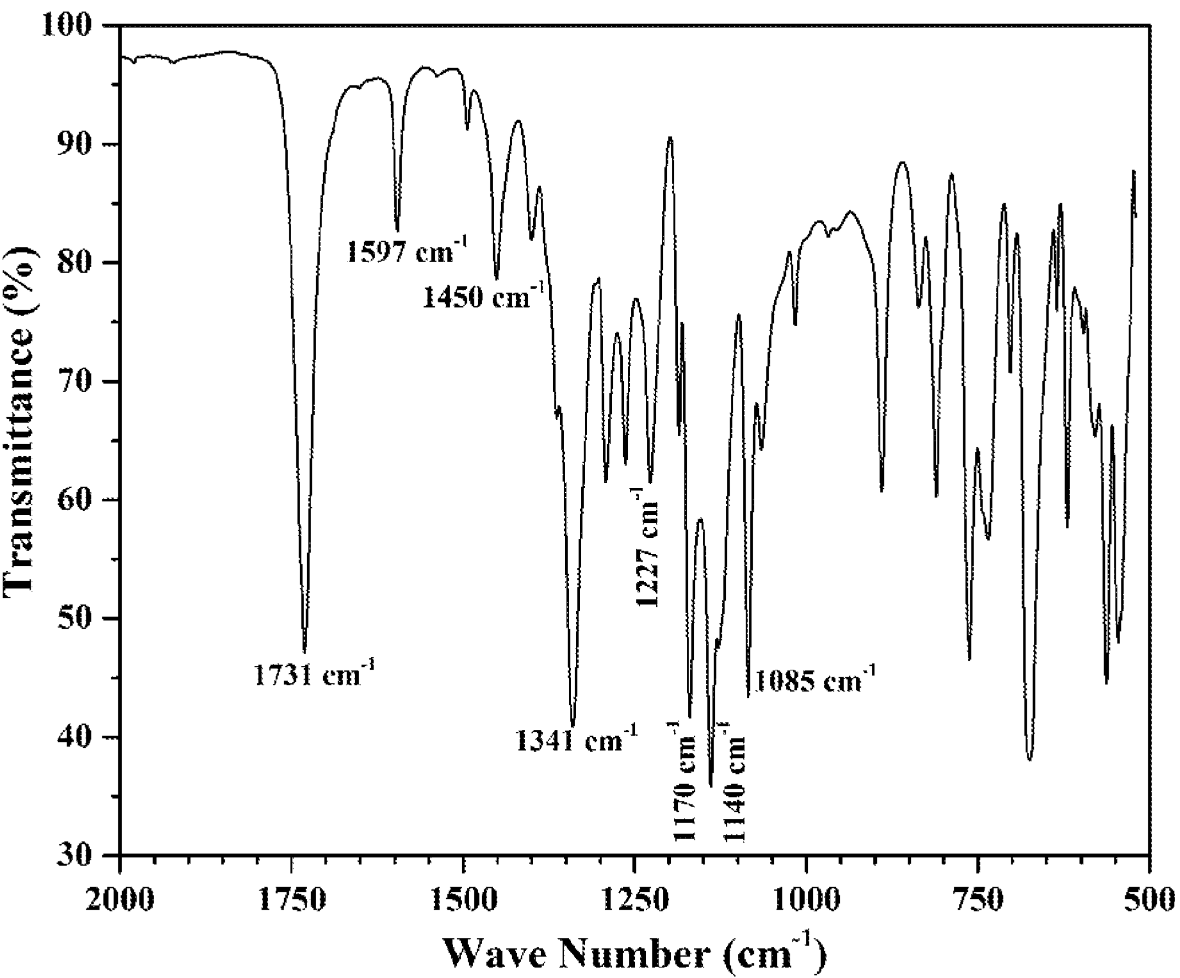
FIG. 23 is a FTIR spectrum for a polymer (Entry 10, Table 2) according to one or more embodiments of the present disclosure.
Figure 24:
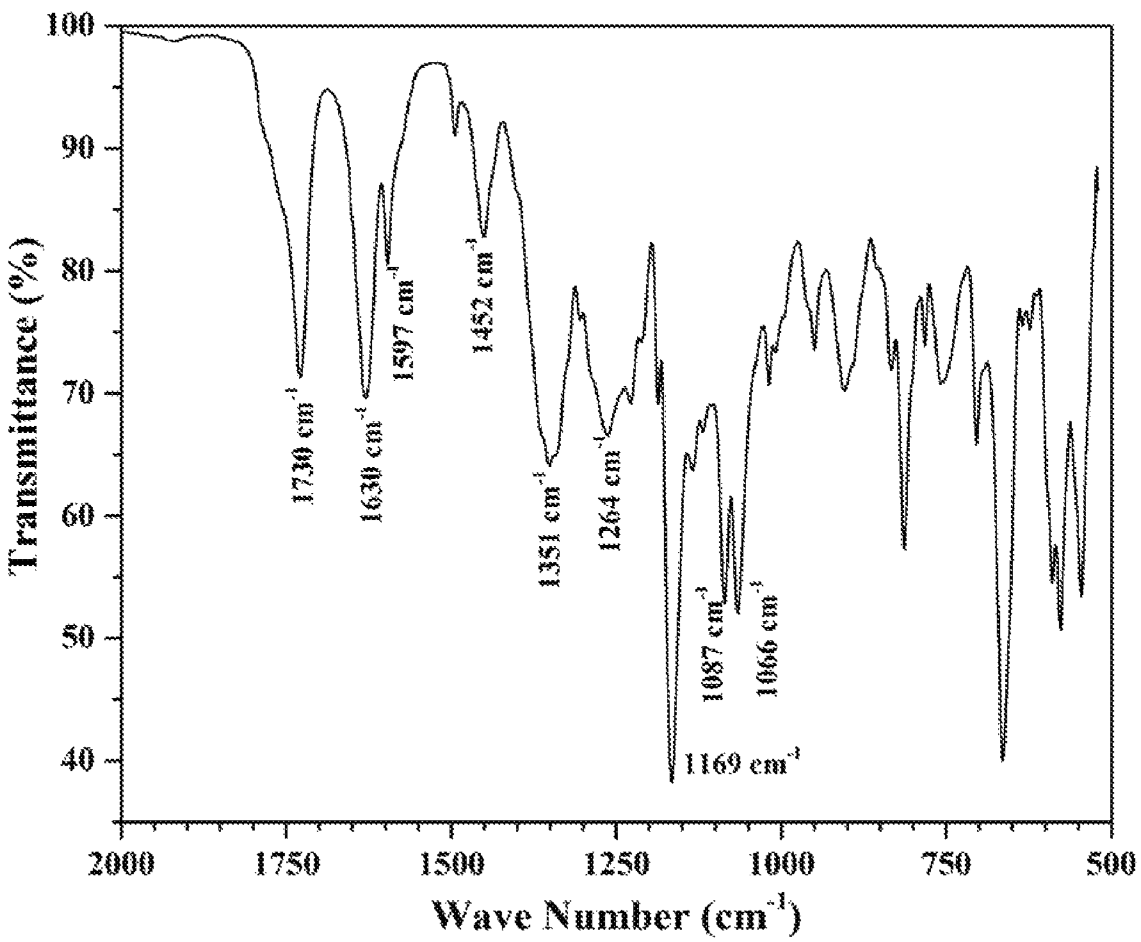
FIG. 24 is a FTIR spectrum for a polymer (Entry 11, Table 2), according to one or more embodiments of the present disclosure.
Figure 25:
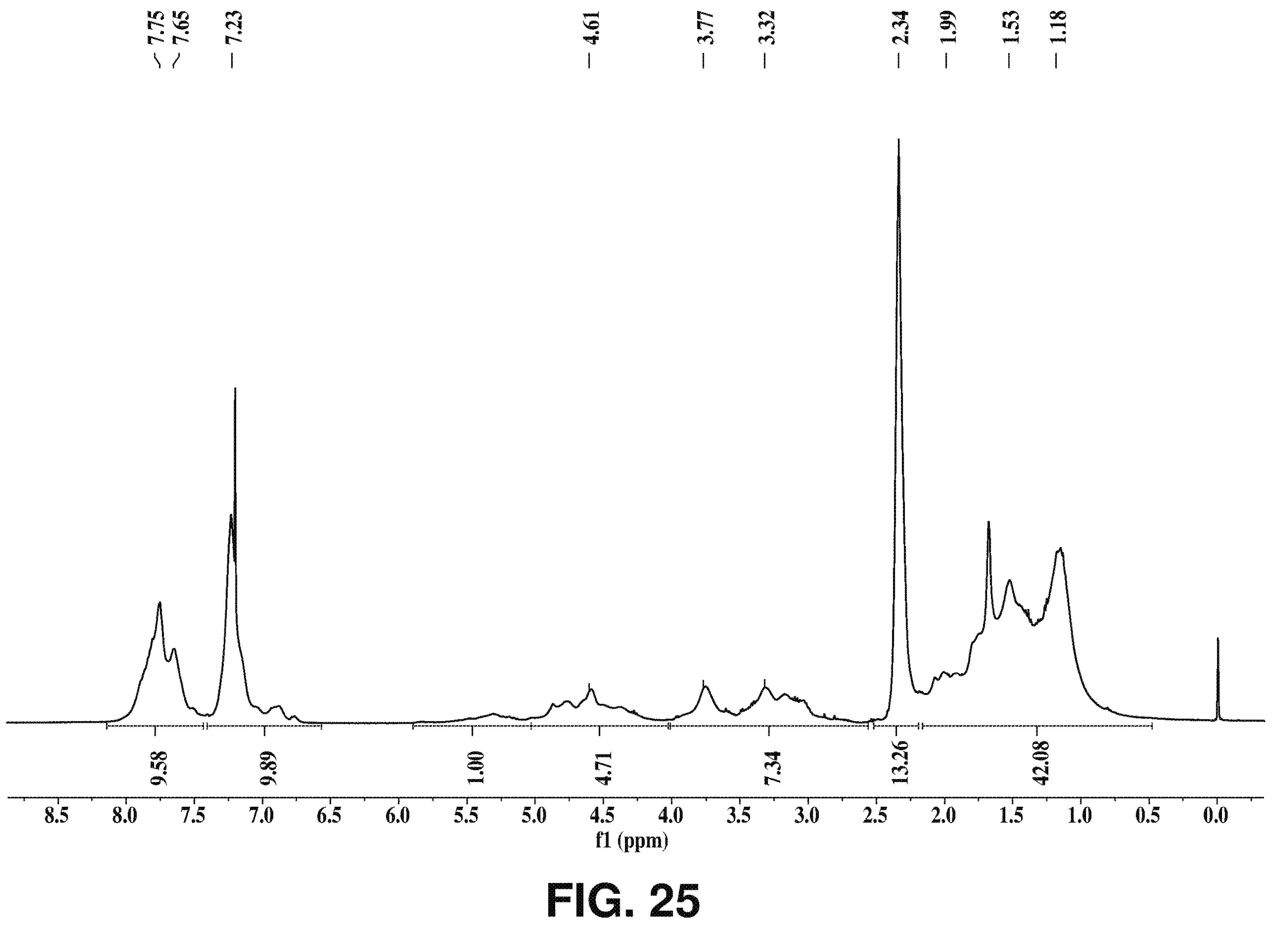
FIG. 25 is a $^1$H NMR spectrum of the polymer (Entry 11, Table 2) according to one or more embodiments of the present disclosure, in $CDCl_3$.
Figure 26:
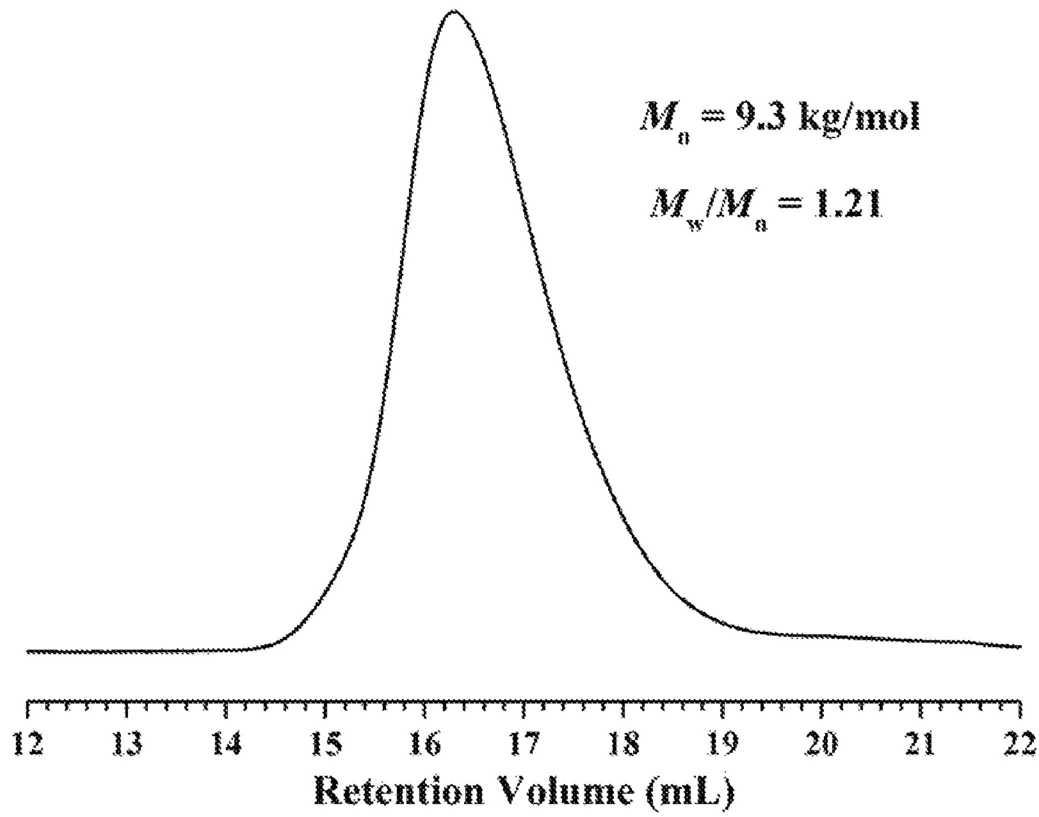
FIG. 26 is a GPC trace for the polymer (Entry 11, Table 2) according to one or more embodiments of the present disclosure, in THF.
Figure 27:
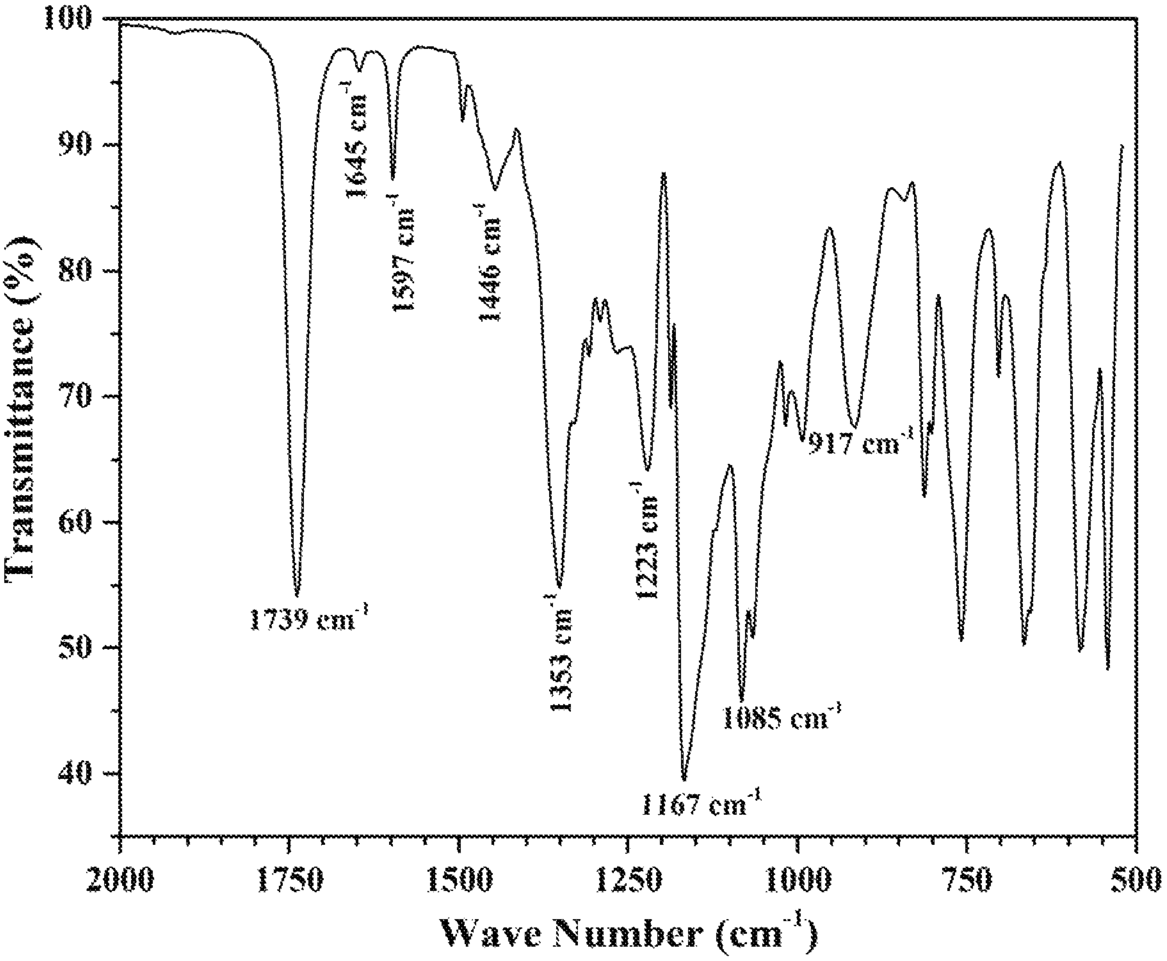
FIG. 27 is a FTIR spectrum for a polymer (Entry 12, Table 2), according to one or more embodiments of the present disclosure.
Figure 28:
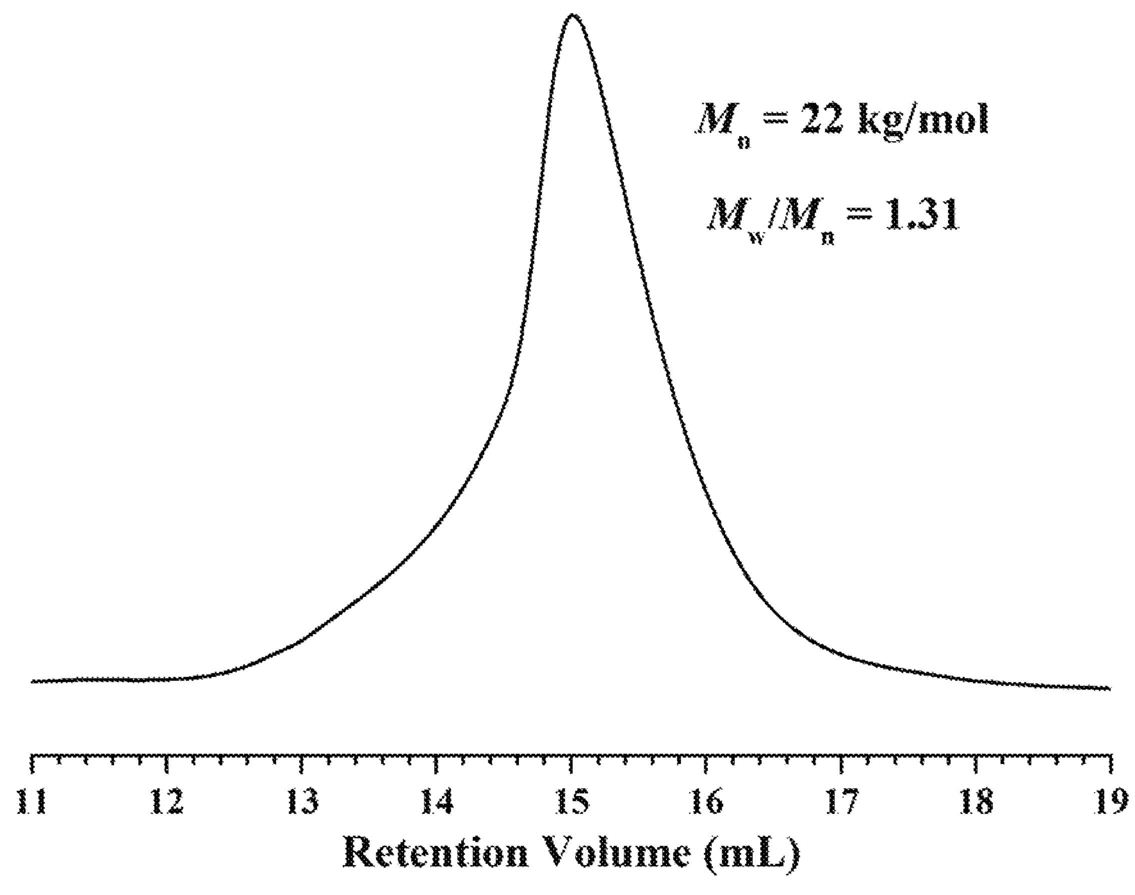
FIG. 28 is a GPC trace for the polymer (Entry 12, Table 2) according to one or more embodiments of the present disclosure, in THF.

The present disclosure features materials and methods for synthesizing polycarbamate copolymers (e.g., polyurethanes and polythiourethanes) via chain-growth copolymerization by contacting a oxirane or thiirane moiety and at least one additional reactant selected from heteroallenes including isocyanates and isothiocyanates, in the presence of a Lewis acid, and copolymers synthesized using these materials and methods.

Definitions

The terms recited below have been defined as described below. All other terms and phrases in this disclosure shall be construed according to their ordinary meaning as understood by one of skill in the art.

"Copolymers" include polymers with at least two different repeating units incorporated into the polymer chain. The terms "terpolymer" or "multicomponent polymerization" indicate that three or more types of repeating units are incorporated into the polymer chain. The properties of an individual polymer chain are determined by the types and relative proportion of each repeating unit.

"Polyurethanes" and "polycarbamates" refer interchangeably to polymers with multiple carbamate groups joined by "urethane" linkages (i.e., polymer composed of macromolecules containing carbamate (urethane) linkages in the backbone: —NH—CO—O—).

"Chain-growth copolymerization" is differentiated from step-growth polymerization (e.g., condensation), and refers to polymerization via a sequence of initiation, propagation, and termination, whereby the first reactant adds to the growing chains of propagation.

As used herein, "contacting" refers to bringing two or more components in proximity, such as physically, chemically, electrically or a combination thereof. Mixing is an example of contacting.

As used herein, "ate complex" refers to the salt formed when a Lewis acid gains one bond by reaction with a base and becomes a negative anion. See Scheme 1. The ate complex may be used to initiate the copolymerization of the oxime or thiirane-containing monomer and a heteroallene via a carbamate linkage.

As used herein, "initiator" refers to salts capable of coordinating with the Lewis acid to form an ate complex. Exemplary initiators include tetrabutylammonium chloride (TBACl), Bis(triphenylphosphoranylidene) ammonium chloride (PPNCl), 1,4-dihydroxylmethylbenzene/$P_4$-t-Bu (DHMB/$P_4$-t-Bu), tetrabutylammonium butanolate (TBABO), tetraoctylammonium chloride (TOACl), Bis(triphenylphosphoranylidene)-ammonium acetate (PPNAc), hydroxylmethylbenzene/$P_4$-t-Bu (HMB/$P_4$-t-Bu), and tetrabutylammonium succinate (TBAS), having the respective structures below:

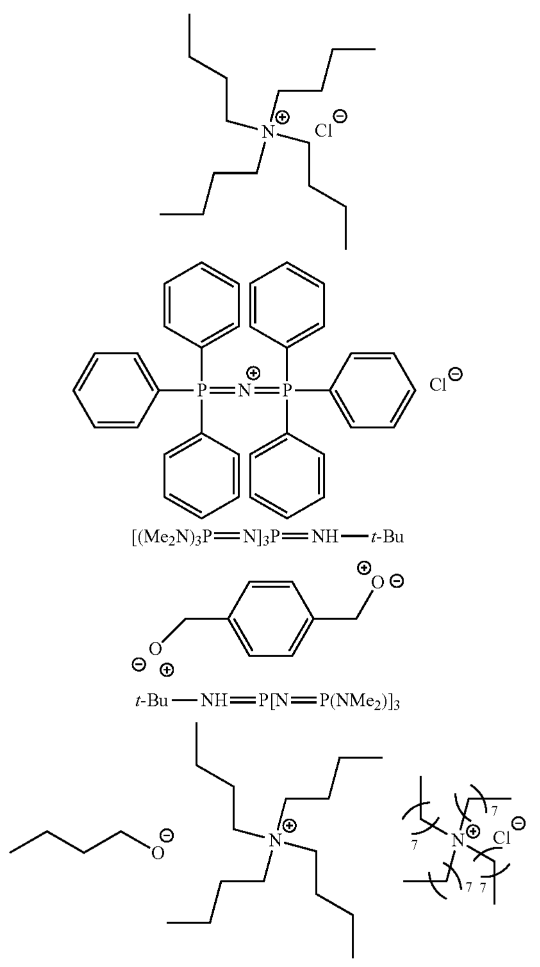

-continued

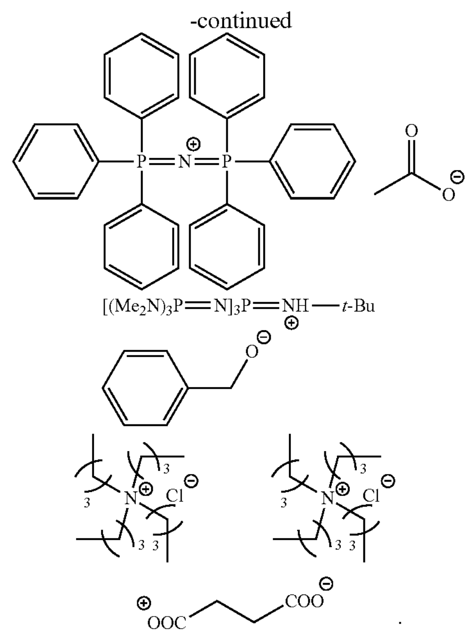

A "heteroallene" includes compounds having a Y=C=Y' bond in the molecule, wherein Y is an oxygen atom, a nitrogen atom, or a sulfur atom, and Y' is an oxygen atom, a nitrogen atom, or a sulfur atom. A heteroallele is an isocyanate compound when Y is a nitrogen atom and Y' is an oxygen atom; an isothiocyanate compound when Y is a nitrogen atom and Y' a sulfur atom; carbon dioxide when both Y and Y' are oxygen atoms; carbonyl sulfide when Y is an oxygen atom and Y' is a sulfur atom; and carbon disulfide when both Y and Y' are sulfur atoms. Exemplary heteroallenes include: trichloroacetyl isocyanate (TCAI), chlorosulfonyl isocyanate (CSI), benzene sulfonyl isocyanate (BSI), p-toluenesulfonyl isocyanate (TSI), 4-chlorobenzenesulfonyl isocyanate (CBSI), 4-nitrophenyl isocyanate (NPI), 4-trifluoromethylphenyl isocyanate (TFMPI), 4-fluorophenyl isocyanate (FPI), pentafluorophenyl isocyanate (PFPI), 3,5-bis(trifluoromethyl)-phenyl isocyanate (BTFMPI), carbon dioxide, carbon disulfide, carbonyl sulfide, phenyl isothiocyanate (PIT), benzoyl isothiocyanate (BzIT), 4-fluorophenyl isothiocyanate (FPIT), 4-nitrophenyl isothiocyanate (NPIT), 4-trifluoromethylphenyl isothiocyanate (TFMPIT), allyl isothiocyanate (AIT), acetyl isothiocyanate (AcIT), ethoxycarbonyl isothiocyanate (EOCIT), pentafluoro isothiocyanate (PFIT), and 3,5-bis(trifluoromethyl)phenyl isothiocyanate (BTFMPIT).

FIG. 1 describes method 100 for making a polycarbamate copolymer according to one or more embodiments of the present disclosure. Method 100 includes contacting step 101 in which an oxirane- or thiirane-containing reactant and an isocyanate- or isothiocyanate-containing reactant are contacted in the presence of a Lewis acid. Step 102 includes agitating the reactants at a predetermined temperature for a predetermined duration thereby initiating polymerization of the reactants and propagating growth of the copolymer chains (i.e., chain-growth copolymerization). Step 103 includes terminating the reaction. In some cases, the method includes step 104 to purify the resulting polycarbamate copolymer.

Returning to contacting step 101, the first reactant having a oxirane or thiirane moiety (i.e., the oxirane- or thiirane-containing reactant) can be a substituted or unsubstituted epoxide or episulfide, including monosubstituted, disubstituted, trisubstituted or tetrasubstituted epoxides or episulfides. Disubstituted epoxides and episulfides can include 1,2 disubstituted alkyl epoxides and episulfides, 1,1-disubstituted epoxides and episulfides, and polycyclic epoxides and episulfides.

The first reactant can have the structure of formula (III):

(III)

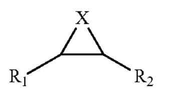

wherein, X is S or O, and each occurrence of $R_1$ and $R_2$ is independently hydrogen or a hydrocarbyl group selected from the group consisting of substituted or unsubstituted monovalent alkyl, alkenyl, arenyl, aryl and aralkyl groups and divalent alkylene, alkenylene, arenylene, arylene and aralkylene groups in which one carbon atom of $R_1$ is covalently bonded to a carbon of $R_2$ to form a cyclic aliphatic structure. For example, the first reactant can be an epoxide such as ethylene oxide (EO), propylene oxide (PO), 1-butylene oxide (BO), 1-hexene oxide (HO), 1-ocene oxide (OO), glycidyl ethers, glycidyl esters, butyl glycidyl ether (BGE), 2-ethylhexyl glycidyl ether (EHGE), phenyl glycidyl ether (PGE), benzyl glycidyl ether (BzGE), glycidyl azide (GA), allyl glycidyl ether (AGE), styrene oxide (SO), epichlorohydrin (ECH), cyclopentene oxide (CPO), cyclohexene oxide (CHO), 4-vinyl-1-cyclohexene 1,2-epoxide (VCHO), or limonene oxide (LO), with exemplary structures shown below:

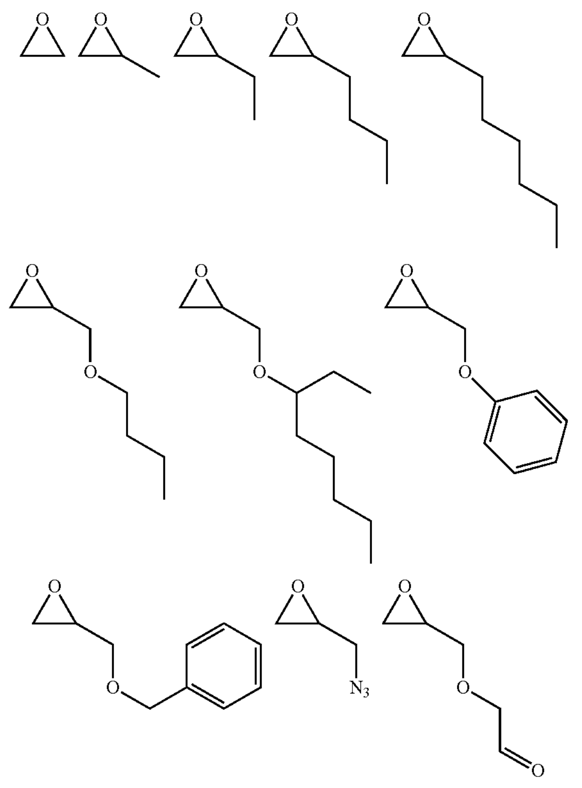

-continued

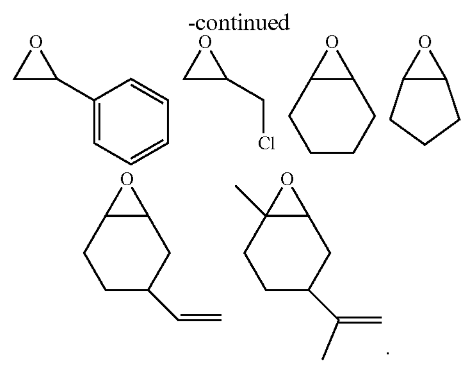

Sometimes, the first reactant is an episulfide such as ethylene sulfide (EES), propylene sulfide (PES), styrene episulfide (SES), epithiochlorohydrine (ETCH), 1-butylene episulfide (BES), 1-hexene episulfide (HES), 1-ocene episulfide (OES), 2-(butoxymethyl) thiirane (BOMT), 2-(allyloxymethyl) thiirane (AOMT), cyclohexene episulfide (CHES), 2-(benzyloxymethyl) thiirane (BzOMT), or 2-(phenoxymethyl) thiirane (PhOMT), with exemplary structures shown below:

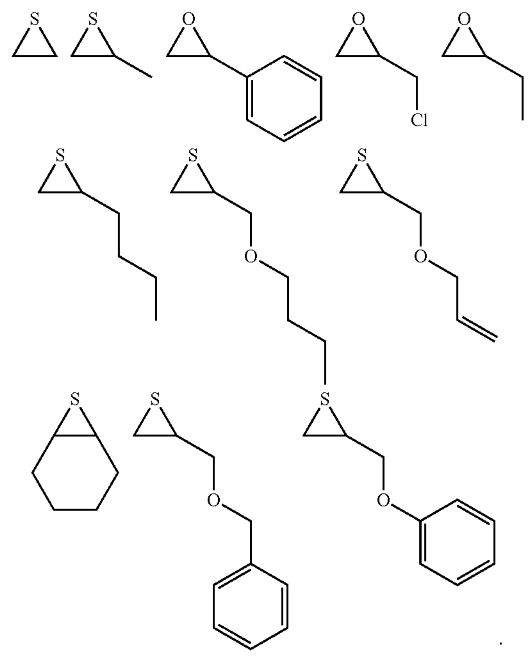

The isocyanate- or isothiocyanate-containing reactant can have the structure of formula (IV) (i.e., a first heteroallene):

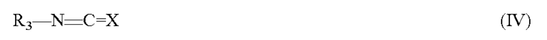

$R_3—N=C=X$ (IV)

wherein $R_3$ is an electro-deficient group and X is an oxygen atom or a sulfur atom. The electro-deficient group reduces side reactions such as trimerization of isocyanates and facilitates copolymerization under mild reaction conditions. Suitable electro-deficient groups include phenyl, benzoyl, acetyl, trichloroacetyl, allyl, benzenesulfonyl, p-toluenesulfonyl, 4-chlorobenzenesulfonyl, 4-fluorobenzenesulfonyl, chlorosulfonyl, fluorinated phenyl having one to five fluorine atoms located at the ortho-, meta-, or para-position; phenyl having one or more nitro groups located at the ortho-, meta-, or para-position; phenyl having one or more trifluoromethyl groups located at the ortho-, meta-, or para-position, and phenyl having two or more different substitutions selected from the group consisting of halogen atoms, fluorine atoms, nitro groups, trifluoromethyl groups, aromatic groups, cyclic alkyl groups, and heteroatom-containing alkyl groups.

For example, the first heteroallene can be an isocyanate selected from the group consisting of trichloroacetyl isocyanate (TCAI), chlorosulfonyl isocyanate (CSI), benzenesulfonyl isocyanate (BSI), p-toluenesulfonyl isocyanate (TSI), 4-chlorobenzenesulfonyl isocyanate (CBSI), 4-nitrophenyl isocyanate (NPI), 4-trifluoromethylphenyl isocyanate (TFMPI), 4-fluorophenyl isocyanate (FPI), pentafluorophenyl isocyanate (PFPI), and 3,5-bis(trifluoromethyl)-phenyl isocyanate (BTFMPI), with exemplary structures shown below:

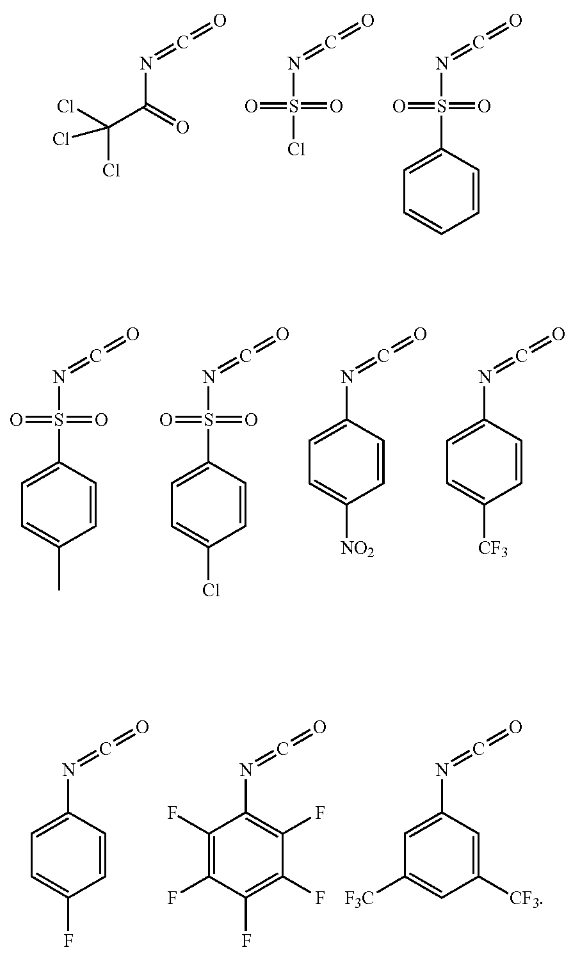

Sometimes the first heteroallene is an isothiocyanate selected from the group consisting of phenyl isothiocyanate (PIT), benzoyl isothiocyanate (BzJT), 4-fluorophenyl isothiocyanate (FPJT), 4-nitrophenyl isothiocyanate (NPJT), 4-trifluoromethylphenyl isothiocyanate (TFMPJT), allyl isothiocyanate (AIT), acetyl isothiocyanate (AcIT), ethoxycarbonyl isothiocyanate (EOCIT), pentafluorophenyl isothiocyanate (PFPJT), and 3,5-bis(trifluoromethyl)-phenyl isothiocyanate (BTFMPJT), with exemplary structures shown below:

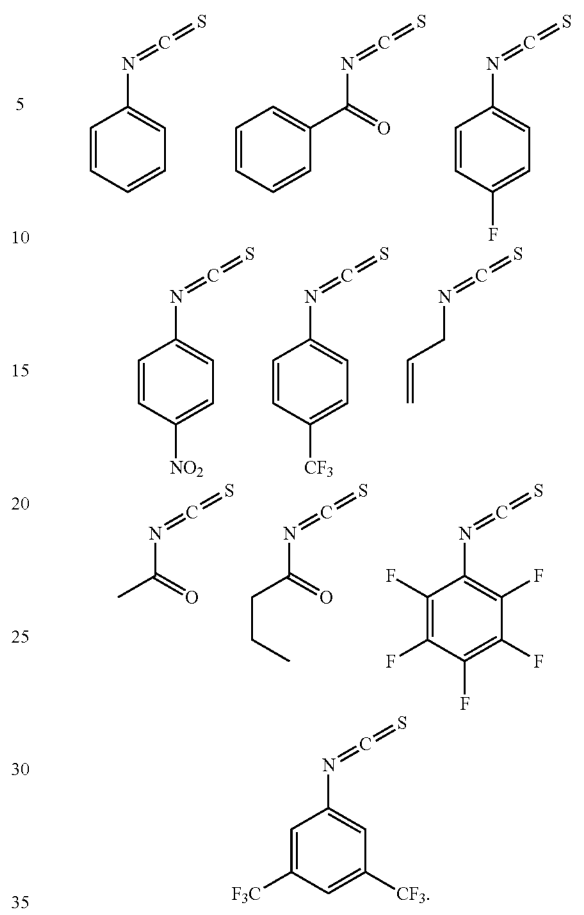

Contacting step 101 can include combining the first reactant and the first heteroallene at a predetermined molar ratio. For example, the molar ratio of the first reactant to the isocyanate or isothiocyanate reactant can be within a range of about 1:20 to about 20:1, such as about 1:1, about 2:1, about 2:3, about 4:1, and about 10:11. The molar ratios can be substantially maintained in the resulting copolymer (e.g., see Tables 1-3).

The Lewis acid can be selected from the group consisting of borane-, aluminum-, magnesium- and zinc-based Lewis acids, such as alkylborane, trialkylborane, alkylaluminum, trialklyaluminum, dialkylzinc, and dialkylmagnesium. For example, the Lewis acid can be triethylborane (TEB), triphenylborane (TPB), triisobutylborane (TsBB), tris(pentafluorophenyl)borane (BCF), trimethylaluminum (TMA), triethlyaluminum (TEA), triisobutylaluminum (TiBA), triphenylaluminum (TPA), trioctylaluminum (TOA), dimethylzinc (DMZ), diethylzinc (DEZ), diphenylzinc (DPZ), or di-n-butylmagnesium (DBM). In certain embodiments, the Lewis acid is a metal-free Lewis acid, such as the borane-based Lewis acids described above. Exemplary structures of Lewis acids are shown below:

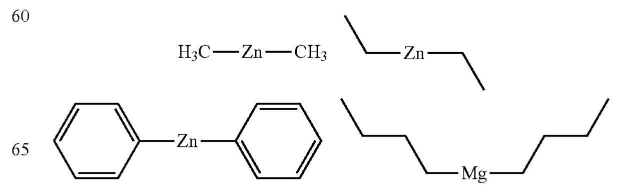

-continued

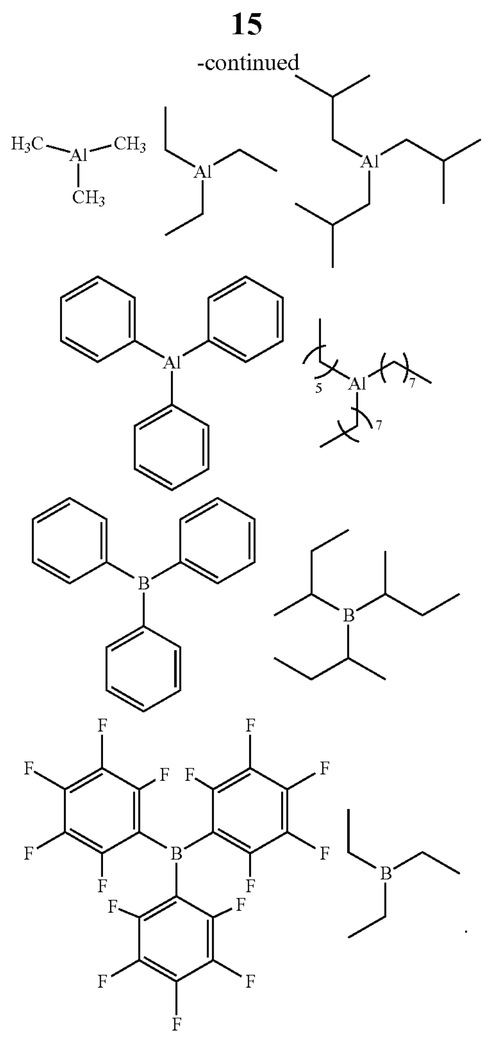

Contacting step 101 can include adding an initiator to the combination of the reactants and the Lewis acid. The initiator can be selected to provide an anion and cation for formation of an ate complex with the Lewis acid. In some cases, the initiator is selected from the group consisting of salts having an halide, carboxylate, or alkoxide anion, and a tetraalkylammonium, tetraalkylphosphonium, or phosphazenium cation. For example, the initiator can be tetrabutylammonium chloride (TBACl), Bis(tripheylphosphoranylidne)-ammonium chloride (PPNCl), tetraoctylammonium chloride (TOACl), Bis(tripheylphosphoranylidne)-ammonium acetate (PPNAc), 1,4-dihydroxylmethyl benzene/$P_4$-t-Bu (DHMB/$P_4$-t-Bu), tetrabutylammonium butanolate (TBABO), hydroxylmethyl benzene/$P_4$-t-Bu (HMB/$P_4$-t-Bu), or tetrabutylammonium succinate (TBAS). The initiator can be added at a predetermined molar ratio with the Lewis acid. In some cases, the Lewis acid can be present in molar excess to the initiator, to be available to form the ate complex and also to activate the first reactant (see Scheme 1). The molar ratio of Lewis acid to initiator can be within a range of about 0.5:1 to 4:1. In some cases, method 100 is a method of making a terpolymer. Thus, contacting step 101 can include the use of an additional heteroallene selected from carbon dioxide, carbon disulfide, and carbonyl sulfide. Contacting step 101 can include combining the first reactant, the first heteroallene, and the second heteroallene at a predetermined molar ratio. For example, the molar ratio of the first reactant to the first heteroallene to the second heteroallene can be within a range of about 1-20:1-20:1-20, about 1-10:1-10:1-10, or about 1-5:1-5:1-5. In some cases, the ratio of the first reactant to the first heteroallene to the second heteroallene can be selected from the group consisting of about 2:1:1, about 4:3:1, about 5:4:1, about 5:3:2, and about 10:9:1. The ratios can be substantially maintained in the resulting terpolymer. The order of addition of reactants can be controlled to provide block or gradient terpolymers, for example. For example, the first reactant can be added to a reaction vessel in a first addition step, and then the first heteroallene can be added in a second addition step. The first heteroallene can be added to the reaction vessel at the same time as the additional heteroallene(s), or the first and additional heteroallenes can be added sequentially.

In some cases, the reactants and Lewis acid are contacted in the presence of a solvent. A suitable solvent can be selected based on the solubility of the reactants, the Lewis acid, or the initiator. Generally, the solvent is selected from the group of organic solvents including heterocyclic compounds, hydrocarbons, aromatic hydrocarbons, aliphatic hydrocarbons, halogenated hydrocarbons, ethers, esters, ketones. For example, the solvent can be hexane, tetrahydrofuran, toluene, methylene chloride, chloroform, 1,2-dichloroethane, propylene carbonate, acetonitrile, dimethylformamide, N-methyl-2-pyrrolidone, dimethyl sulfoxide, 1,4-Dioxane, and 1,3-Dioxane. In certain embodiments the solvent is tetrahydrofuran Step 102 includes agitating (e.g., stirring) the reactants at a predetermined temperature. Methods of the present disclosure can employ mild reaction conditions. The predetermined temperature can be within a range of about 0° C. to about 80° C., optionally about 20° C. to about 60° C. In some cases, the reactants are agitated at ambient or room temperature. The duration of agitation and temperature control, if needed, can be within a range of about 4 hours to about 20 hours. For example, the reactants can be agitated for about 4, 6, 8, 10, 12, 15, 18, or 20 hours at the predetermined temperature.

Step 103 includes terminating the reaction by stopping the formation of reactive intermediates. Termination can be achieved by reactant consumption or by quenching the reaction. The reaction can be quenched by the addition of hydrochloric acid. Upon quenching with hydrochloric acid (HCl), the copolymer product can have a hydrogen end group (See Schemes 1 and 2).

In some cases, method 100 includes step 104 to separate the copolymer product from the crude product. Separation can include precipitating the copolymer by adding a precipitating agent. The selection of a suitable precipitating agent can be based on the copolymer structure. Sometimes, methanol can be used. The purified copolymer can be characterized by one or more methods within the purview of the skilled artisan. The resulting copolymer can be categorized based on the comonomer distribution and can be a statistical (e.g., random), gradient, alternating, or block copolymer.

Embodiments of method 100 can be used to expand the structural diversity of polycarbamate copolymers. Methods described in the present disclosure can be used to prepare polycarbamate copolymers having arrangements that have not been attainable using previously described synthetic strategies.

Embodiments of the present disclosure feature a polycarbamate copolymer represented by formula (I):

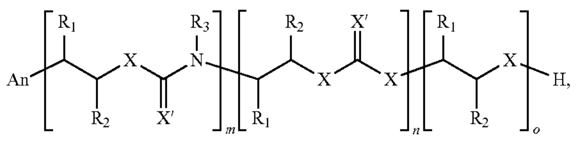

wherein An is a halogen atom or a carboxylate or alkoxide moiety; $R_1$ and $R_2$ at each occurrence are independently selected from a hydrogen atom or an alkyl group including linear, branched, saturated, unsaturated, aromatic, cyclic alkyl groups, and heteroatom-containing alkyl groups; $R_3$ is an electron deficient group; and m and o are independently selected from integers ≥1 and n is 0 or an integer ≥1. The An carboxylate and alkoxide can be selected from the group consisting of mono- or polyfunctional carboxylates and mono- or polyfunctional alkoxides. The X and X' can be the same (i.e. both X and X' are oxygen or both X and X' are sulfur), or different (i.e., either X is oxygen and X' is sulfur, or X' is oxygen and X is sulfur) within the same repeating unit or within all the repeating units. In some cases, X=X' at all instances in the m repeating unit, the n repeating unit, or all repeating units. Each X can be the same at each instance in the polymer. In some cases, the copolymer is fully alternating.

The value of n can be an integer ≥1, e.g., when the copolymer is a terpolymer. The terpolymer can be a random, block, or gradient copolymer. $R_1$ and $R_2$ can be independently selected from the group consisting of a hydrogen atom, linear or branched, saturated or unsaturated $C_1$-$C_{20}$ alkyl groups, $C_1$-$C_{20}$ alkyl groups having one or more aromatic rings and linear or branched heteroatom-containing $C_1$-$C_{20}$ alkyl groups, wherein the heteroatom includes one or more atoms selected from O, N, S, Si, P, and halogen atoms. $R_3$ can be selected from the group consisting of phenyl, benzoyl, acetyl, trichloroacetyl, allyl, benzenesulfonyl, p-toluenesulfonyl, 4-chlorobenzenesulfonyl, 4-fluorobenzenesulfonyl, chlorosulfonyl, fluorinated phenyl having one to five fluorine atoms located at the ortho-, meta-, or para-position; phenyl having one or more nitro groups located at the ortho-, meta-, or para-position; phenyl having one or more trifluoromethyl groups located at the ortho-, meta-, or para-position, and phenyl having two or more different substitutions selected from the group consisting of halogen atoms, fluorine atoms, nitro groups, trifluoromethyl groups, aromatic groups, cyclic alkyl groups, and heteroatom-containing alkyl groups.

The copolymer can have a number average molecular mass ($M_n$) within a range of about 1,000 to about 300,000 kg/mol. The number average molecular mass can be determined by Gel permeation chromatography.

The copolymer can be substantially uniform. Thus, the breadth of the molar mass distribution of the copolymer can be relatively narrow. For example, the copolymer can have a dispersity of less than 2, such as within a range of 1 to about 1.6, or about 1.1, 1.2, 1.3, 1.4, 1.5, or 1.6.

In certain embodiments, the copolymer has the structure of formula (II):

(II)

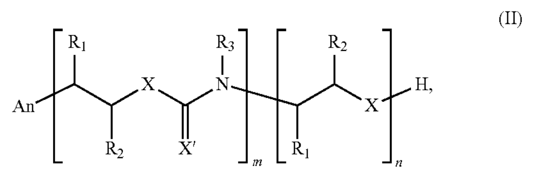

wherein An, X, X', $R_1$, $R_2$ and $R_3$ are defined as for Formula (I); and m and n are independently selected from integers ≥1.

The following Examples are intended to illustrate the above invention and should not be construed as to narrow its scope.

EXAMPLES

Copolymerization of Epoxides or Episulfides with Isocyanates and Other Heteroallene Monomers by Ate Complexes for Polyurethanes and their Copolymers The following examples describe a new method for the synthesis of polyurethanes or polycarbamates through copolymerization of epoxides with isocyanates as shown in Scheme 1.

Scheme 1

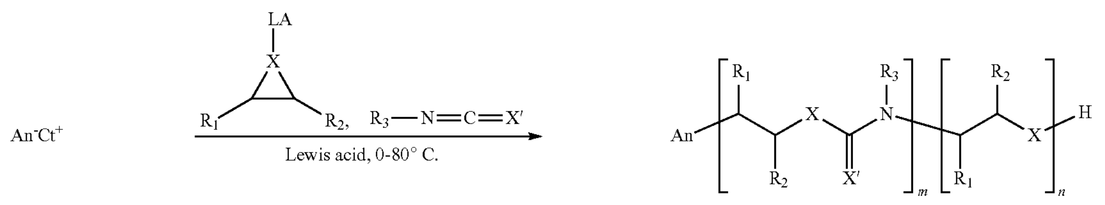

-continued

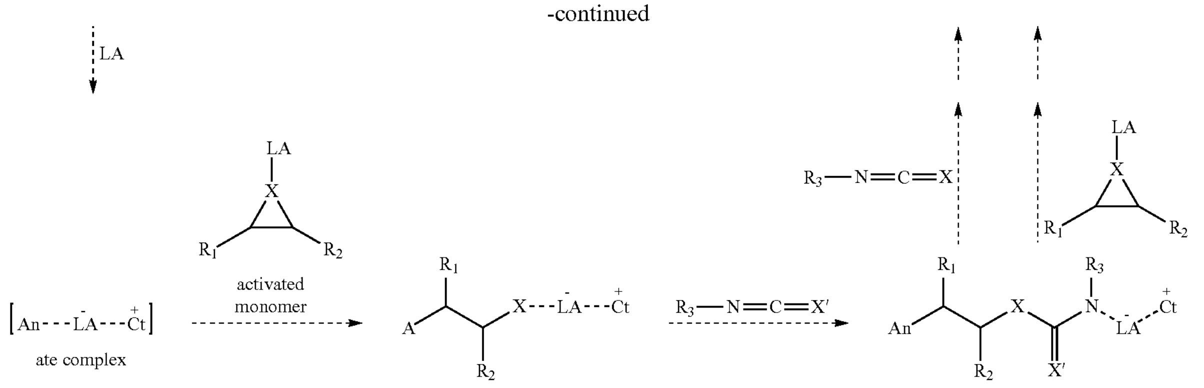

An represents an anion selected from halides, carboxylates and alkoxides, which carboxylates and alkoxides can be selected from the group consisting of mono- or polyfunctional carboxylates and alkoxides;

Ct* represents a cation selected from tetraalkylammoniums, tetraalkylphosphoniums, and phosphazeniums;

Each X and X' represents an oxygen or a sulfur atom, and each X and X' may represent same species of atom (i.e., both X and X' are oxygen or both X and X' are sulfur), or different species of atom (i.e., either X is oxygen and X' is sulfur, or X' is oxygen and X is sulfur) in the scheme;

$R_1$ and $R_2$ independently represent a hydrogen atom, a linear or branched $C_1$-$C_{20}$ alkyl being saturated or unsaturated; a linear or branched $C_1$-$C_{20}$ alkyl containing one or more atoms selected from oxygen atom, nitrogen atom, sulfur atom, silicon atom, phosphorus atom and halogen atom; $C_1$-$C_{20}$ alkyl bearing one or more aromatic rings; $R_1$ and $R_2$ may be the same or different;

$R_3$ represents an electron deficient group which may be one of the following: a phenyl; a benzoyl; an acetyl; a trichloroacetyl; an allyl; a benzenesulfonyl; a p-toluenesulfonyl; a 4-chlorobenzenesulfonyl; a 4-fluorobenzenesulfonyl; a chlorosulfonyl, a fluorinated phenyl bearing one to five fluorine atoms located at ortho-, meta-, or para-position; a phenyl containing one or more nitro groups located at ortho-, meta-, or para-position; a phenyl bearing one or more trifluoromethyl groups located at ortho-, meta-, or para-position; a phenyl substituted with two or more different groups selected from halogen atom, fluorine atom, nitro group, trifluoromethyl;

Lewis acid (LA) based on borane, aluminum, magnesium, zinc, could be any of the following: triethylborane, triphenylborane, triisobutylborane, tris(pentafluorophenyl)borane, trimethylaluminum, triethylaluminum, triisobutylaluminum, triphenylaluminum, trioctylaluminum, dimethylzinc, diethylzinc, diphenylzinc, and di-n-butylmagnesium.

In the presence of trialkylborane or trialkylaluminum or other Lewis acid, the copolymerization of epoxides with isocyanates afford totally alternated polycarbamates: when electro-deficient isocyanates were used, the trimerization of isocyanates was negligible, and polycarbamates were obtained under mild condition as main products. Such polymerization conditions were also applied to isothiocyanates, and heterocyclic monomer such as episulfide.

1. General Procedure for the Copolymerization of Epoxide or Episulfide with Heteroallene.

In a glovebox, the initiator, epoxide (episulfide), heteroallene, the Lewis acid together with a solvent were added in a Schlenk reactor. See Table 1 (FIG. 2) for specific compounds. For gaseous heteroallenes, the reaction was conducted in a Parr pressure vessel and the gas is charged outside the glovebox. The reactor was sealed before taking out of the glovebox. The reaction medium was stirred at a designated temperature for a designated period of time. The residual pressure (if there was any) was released from the reactor. Then the reaction was quenched with hydrochloric acid solution in tetrahydrofuran. Purification of the polymer from the crude product was performed by repeated precipitation from methanol. Reaction conditions and data for entries 1-18 are described in FIGS. 2-8.

2. Trialkylborane-Mediated Copolymerization of Epoxides with p-Tosyl Isocyanate.

Using the general procedure described above, the initiator, epoxide (episulfide), p-tosyl isocyanate, and the Lewis acid together with a solvent were added in a Schlenk reactor in a glove box. See Table 2 (FIG. 9) for specific compounds and reaction conditions. Data for entries 1-12 are shown in FIGS. 10-28.

3. Lewis Acid Assisted Terpolymerization of Epoxides or Episulfides with Two Heteroallenes.

The preparation of copolymers (statistic, gradient or block copolymers) through terpolymerization with heteroallene monomers such as carbon dioxide, carbon disulfide or carbonyl sulfide is shown in Scheme 2 (variables defined as in Scheme 1).

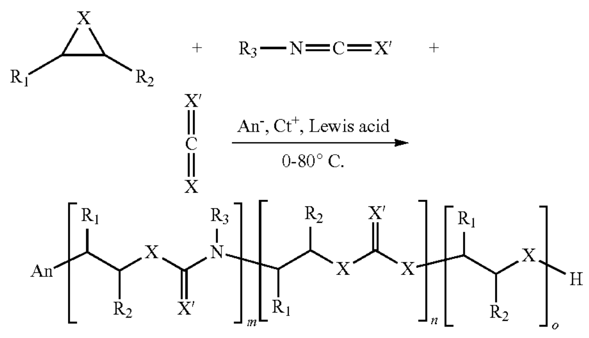

Using the general procedure described above, the initiator, epoxide (episulfide), heteroallenes, and the Lewis acid together with a solvent were added in a Schlenk reactor in a glove box. See Table 3 (FIG. 29) for specific compounds and reaction conditions for entries 1-12.

Other embodiments of the present disclosure are possible. Although the description above contains much specificity, specific examples should not be construed as limiting the scope of the disclosure. Various combinations or sub-combinations of the specific features and aspects of the embodiments may be made, which fall within the scope of this disclosure. Various features and aspects of the disclosed embodiments can be combined with or substituted for one another. Various examples have been described. These and other examples are within the scope of the following claims.

The scope of this disclosure should be determined by the appended claims and their legal equivalents. Reference to an element in the singular is not intended to mean "one and only one" unless explicitly so stated. All structural, chemical, and functional equivalents to the elements of the above-described embodiments known to those of ordinary skill in the art are expressly incorporated herein by reference and are intended to be encompassed by the present claims. No element, component, or method step in the present disclosure is intended to be dedicated to the public regardless of whether the element, component, or method step is explicitly recited in the claims.

What is claimed is:

1. A method of making a polycarbamate copolymer comprising:

forming a polycarbamate copolymer by contacting, in the presence of a Lewis acid, a first reactant comprising an oxirane or thiirane moiety and one or more additional reactants selected from heteroallenes, wherein a first heteroallene is selected from the group consisting of isocyanates and isothiocyanates, wherein the Lewis acid is an alkylborane, trialkylborane, triethylborane, triphenylborane, triisobutylborane, tris (pentafluorophenyl)borane, alkylaluminum, trialklyaluminum, trimethylaluminum, triethlyaluminum, triisobutylaluminum, triphenylaluminum, trioctylaluminum, dimethylzinc, diethylzinc, diphenylzinc, or di-n-butylmagnesium, wherein the polycarbamate copolymer is formed using chain-growth copolymerization.

2. The method of claim 1, wherein the first reactant has the structure of formula (III):

(III)

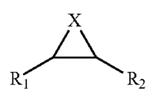

wherein, X is S or O, and each occurrence of $R_1$ and $R_2$ is independently hydrogen or a hydrocarbyl group selected from the group consisting of substituted or unsubstituted monovalent alkyl, alkenyl, arenyl, aryl and aralkyl groups and divalent alkylene, alkenylene, arenylene, arylene and aralkylene groups in which one carbon atom of $R_1$ is covalently bonded to a carbon of $R_2$ to form a cyclic aliphatic structure.

3. The method of claim 1, wherein the first reactant is an epoxide selected from the group consisting of ethylene oxide (EO), propylene oxide (PO), 1-butylene oxide (BO), 1-hexene oxide (HO), 1-ocene oxide (OO), glycidyl ethers, glycidyl esters, butyl glycidyl ether (BGE), 2-ethylhexyl glycidyl ether (EHGE), phenyl glycidyl ether (PGE), benzyl glycidyl ether (BzGE), glycidyl azide (GA), allyl glycidyl ether (AGE), styrene oxide (SO), epichlorohydrin (ECH), cyclopentene oxide (CPO), cyclohexene oxide (CHO), 4-vinyl-1-cyclohexene 1,2-epoxide (VCHO), and limonene oxide (LO).

4. The method of claim 1, wherein the first reactant is an episulfide selected from the group consisting of ethylene sulfide (EES), propylene sulfide (PES), styrene episulfide (SES), epithiochlorohydrine (ETCH), 1-butylene episulfide (BES), 1-hexene episulfide (HES), 1-ocene episulfide (OES), 2-(butoxymethyl) thiirane (BOMT), 2-(allyloxymethyl) thiirane (AOMT), cyclohexene episulfide (CHES), 2-(benzyloxymethyl) thiirane (BzOMT), and 2-(phenoxymethyl) thiirane (PhOMT).

5. The method of claim 1, wherein the first heteroallene has the structure of formula (IV):

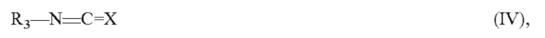

$$R_3—N═C═X \quad (IV),$$

wherein $R_3$ is an electro-deficient group and X is an oxygen atom or a sulfur atom.

6. The method of claim 5, wherein the electro-deficient group is selected from the group consisting of phenyl, benzoyl, acetyl, trichloroacetyl, allyl, benzenesulfonyl, p-toluenesulfonyl, 4-chlorobenzenesulfonyl, 4-fluorobenzenesulfonyl, chlorosulfonyl, fluorinated phenyl having one to five fluorine atoms located at the ortho-, meta-, or para-position; phenyl having one or more nitro groups located at the ortho-, meta-, or para-position; phenyl having one or more trifluoromethyl groups located at the ortho-, meta-, or para-position, and phenyl having two or more different substitutions selected from the group consisting of halogen atoms, fluorine atoms, nitro groups, trifluoromethyl groups, aromatic groups, cyclic alkyl groups, and heteroatom-containing alkyl groups.

7. The method of claim 1, wherein the first heteroallene is an isocyanate selected from the group consisting of trichloroacetyl isocyanate (TCAI), chlorosulfonyl isocyanate (CSI), benzenesulfonyl isocyanate (BSI), p-toluenesulfonyl isocyanate (TSI), 4-chlorobenzenesulfonyl isocyanate (CBSI), 4-nitrophenyl isocyanate (NPI), 4-trifluoromethylphenyl isocyanate (TFMPI), 4-fluorophenyl isocyanate (FPI), pentafluorophenyl isocyanate (PFPI), and 3,5-bis(trifluoromethyl)-phenyl isocyanate (BTFMPI).

8. The method of claim 1, wherein the first heteroallene is an isothiocyanate selected from the group consisting of phenyl isothiocyanate (PIT), benzoyl isothiocyanate (BzIT), 4-fluorophenyl isothiocyanate (FPIT), 4-nitrophenyl isothiocyanate (NPIT), 4-trifluoromethylphenyl isothiocyanate (TFMPIT), allyl isothiocyanate (AIT), acetyl isothiocyanate (AcIT), ethoxycarbonyl isothiocyanate (EOCIT), pentafluorophenyl isothiocyanate (PFPIT), and 3,5-bis(trifluoromethyl)-phenyl isothiocyanate (BTFMPIT).

9. The method of claim 1, wherein the molar ratio of the first reactant to the additional reactant is within a range of about 1:20 to about 20:1.

10. The method of claim 1, further comprising contacting the reactants with an initiator, optionally selected from the group consisting of salts having an halide, carboxylate, or alkoxide anion, and a tetraalkylammonium, tetraalkylphosphonium, or phosphazenium cation.

11. The method of claim 10, wherein the initiator is selected from the group consisting of tetrabutylammonium chloride (TBACl), Bis(tripheylphosphoranylidne)-ammonium chloride (PPNCl), tetraoctylammonium chloride (TOACl), Bis(tripheylphosphoranylidne)-ammonium acetate (PPNAc), 1,4-dihydroxylmethyl benzene/P4-t-Bu (DHMB/$P_4$-t-Bu), tetrabutylammonium butanolate (TBABO), hydroxylmethyl benzene/P4-t-Bu (HMB/$P_4$-t-Bu), and tetrabutylammonium succinate (TBAS).

12. The method of claim 10, wherein the molar ratio of Lewis acid to initiator is within a range of about 0.5:1 to 4:1.

13. The method of claim 1, further comprising a second heteroallene selected from the group consisting of carbon dioxide, carbon disulfide, and carbonyl sulfide.

14. The method of claim 13, wherein the molar ratio of the first reactant to the first heteroallene to the second heteroallene is within a range of about 1-10:1-10:1-10.

15. The method of claim 1, wherein contacting includes adding the first reactant and the one or more additional reactants to a reaction vessel concomitantly or sequentially, optionally wherein contacting includes adding the first heteroallene and a second heteroallene to the reaction vessel concomitantly or sequentially.

16. The method of claim 1, wherein the contacting step is performed at a temperature within a range of about 0° C. to about 80° C., optionally about 20° C. to about 60° C.

17. The method of claim 1, wherein the contacting step is performed for a duration within a range of about 4 hours to about 20 hours, optionally about 12 hours.

18. A method of making a polycarbamate copolymer, comprising:

contacting, in the presence of a Lewis acid, a first reactant comprising an oxirane or thiirane moiety and one or more additional reactants including a first heteroallene;

wherein the Lewis acid is an alkylborane, trialkylborane, triethylborane, triphenylborane, triisobutylborane, tris (pentafluorophenyl)borane, alkylaluminum, trialklyaluminum, trimethylaluminum, triethlyaluminum, triisobutylaluminum, triphenylaluminum, trioctylaluminum, dimethylzinc, diethylzinc, diphenylzinc, or di-n-butylmagnesium; and wherein the first heteroallene is an isocyanate selected from the group consisting of trichloroacetyl isocyanate (TCAI), chlorosulfonyl isocyanate (CSI), benzenesulfonyl isocyanate (BSI), p-toluenesulfonyl isocyanate (TSI), 4-chlorobenzenesulfonyl isocyanate (CBSI), 4-nitrophenyl isocyanate (NPI), 4-trifluoromethylphenyl isocyanate (TFMPI), 4-fluorophenyl isocyanate (FPI), pentafluorophenyl isocyanate (PFPI), and 3,5-bis(trifluoromethyl)-phenyl isocyanate (BTFMPI).

19. A composition for synthesizing a polycarbamate by chain-growth copolymerization comprising:

a Lewis acid, wherein the Lewis acid is an alkylborane, trialkylborane, triethylborane, triphenylborane, triisobutylborane, tris(pentafluorophenyl)borane, alkylaluminum, trialklyaluminum, trimethylaluminum, triethlyaluminum, triisobutylaluminum, triphenylaluminum, trioctylaluminum, dimethylzine, diethylzine, diphenylzine, or di-n-butylmagnesium;

a first reactant comprising an oxirane or thiirane moiety; and one or more additional reactants selected from heteroallenes, including a first heteroallene and a second heteroallene, wherein the first heteroallene is selected from the group consisting of isocyanates and isothiocyanates, and wherein the second heteroallene is selected from the group consisting of carbon dioxide, carbon disulfide, and carbonyl sulfide.

* * * * *